(12) United States Patent
Cuevas et al.

(10) Patent No.: US 9,625,604 B2
(45) Date of Patent: Apr. 18, 2017

(54) ANALYZING SUBTERRANEAN FORMATION WITH CURRENT SOURCE VECTORS

(71) Applicant: Schlumberger Technology Corporation, Sugar Land, TX (US)

(72) Inventors: Nestor Cuevas, Albany, CA (US); David L. Alumbaugh, Berkeley, CA (US); Edward Nichols, Paris (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 208 days.

(21) Appl. No.: 13/928,022

(22) Filed: Jun. 26, 2013

(65) Prior Publication Data

US 2014/0132272 A1    May 15, 2014

Related U.S. Application Data

(60) Provisional application No. 61/664,994, filed on Jun. 27, 2012.

(51) Int. Cl.
| | |
|---|---|
| *G01V 3/00* | (2006.01) |
| *G01V 3/20* | (2006.01) |
| *G01V 3/38* | (2006.01) |
| *G01V 3/30* | (2006.01) |

(52) U.S. Cl.
CPC ............ *G01V 3/20* (2013.01); *G01V 3/30* (2013.01); *G01V 3/38* (2013.01)

(58) Field of Classification Search
CPC .... E21B 47/02216; E21B 47/122; G01V 3/20
USPC ......................................................... 324/355
See application file for complete search history.

(56) References Cited

U.S. PATENT DOCUMENTS

| | | | | |
|---|---|---|---|---|
| 4,372,398 | A * | 2/1983 | Kuckes .................. | E21B 47/02 166/66.5 |
| 5,654,639 | A * | 8/1997 | Locatelli et al. ............. | 324/339 |
| 7,795,872 | B2 * | 9/2010 | Clark et al. ................... | 324/338 |
| 2005/0156602 | A1 | 7/2005 | Conti | |
| 2009/0302852 | A1 | 12/2009 | Levesque et al. | |
| 2010/0097066 | A1 | 4/2010 | Gao | |

FOREIGN PATENT DOCUMENTS

| | | |
|---|---|---|
| JP | 10111332 A | 4/1998 |
| WO | 2013012967 A1 | 1/2013 |

OTHER PUBLICATIONS

International Search Report and the Written Opinion for International Application No. PCT/US2013/048098 dated Oct. 2, 2013.

(Continued)

*Primary Examiner* — Reena Aurora
(74) *Attorney, Agent, or Firm* — Michael Dae

(57) ABSTRACT

A method analyzes a subterranean formation. At least one property of a well casing in the subterranean formation is determined and a plurality of current source vectors at respective positions along a trajectory of the well casing are determined. The effect of the well casing is determined based upon the plurality of current source vectors and the at least one property of the well casing.

23 Claims, 28 Drawing Sheets

(56) References Cited

OTHER PUBLICATIONS

Baranwal, V. C. and M. C. Sinha "3-D Modeling Study of Borehole-seafloor Marine CSEM for Shallow Water Case," 71th EAGE Conference & Exhibition, 5, Amsterdam, The Netherlands, Jun. 8-11, 2009, pp. 3175-3179.

Kong, F. N., F. Roth, P. A. Olsen, and S. O. Stalheim, "Casing effects in the sea-to-borehole electromagnetic method," Geophysics, vol. 74, No. 5, F77-F87.

Liu, H., Z. Wang, and Z. He, "Frequency-domain 3D Borehole-surface Electromagnetic Modeling by the Volume Integral Equation Method," 70th EAGE Conference & Exhibition—Rome, Italy, Jun. 9-12, 2008.

Marsala, A., M. Al-Buali, Z. Ali, S. Ma, Z. He, T. Biyan, T. He, and G. Zhao, "First pilot of borehole to surface electromagnetic in saudi arabia—a new technology to enhance reservoir mapping & monitoring," 73rd EAGE Conference & Exhibition incorporating SPE EUROPEC 2011, Vienna, Austria, May 23-26, 2011.

Marsala, A., M. Al-Buali, Z. Ali, S. Ma, Z. He, T. Biyan, G. Zhao, and T. He, "First Borehole to Surface Electromagnetic Survey in KSA: Reservoir Mapping and Monitoring at a New Scale," Saudi Aramco Journal of Technology, Winter 2011, pp. 36-45.

Ward, S. H. and G. W. Hohmann, Electromagnetic theory for geophysical applications: Electromagnetic Methods in Applied Geophysics—Theory., SEG Investigations in Geophysics, vol. 1,131-311.

International Preliminary Report on Patentability issued in PCT/US2013/048098, dated Jan. 8, 2015. 6 pages.

\* cited by examiner ized in the borehole causes current channeling along its vertical extent and results in an additive contribution to the electromagnetic fields due to currents induced on and leaking out of the surface of the casing. A vertical electric dipole is formed inside the casing as a finite length antenna with an equivalent moment. The ratio between the moment of the source and equivalent antenna is the casing attenuation factor, which increases with frequency. The screening effect of the casing may attenuate the signal and create less resolution to resistive targets behind the casing where the response of the target is used to determine the hydrocarbon reservoirs. It is difficult, however, to determine how the casing distorts any electromagnetic fields that are measured. Existing methods can thus be improved that take into greater account the distortion of the electromagnetic fields caused by the casing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A method, in accordance with a non-limiting example, analyzes a subterranean formation and determines at least one property of a well casing in the subterranean formation. A plurality of current source vectors are determined at respective positions along a trajectory of the well casing. The effect of the well casing is determined based upon the plurality of current source vectors, and the at least one property of the well casing.

A system analyzes a subterranean formation. A processor has a memory coupled thereto and stores at least one property of a well casing in the subterranean formation and determines a plurality of current source vectors at respective positions along a trajectory of the well casing. The processor determines an effect of the well casing based upon the plurality of current source vectors and the at least one property of the well casing.

A non-transitory computer readable medium is for analyzing a subterranean formation and has computer executable instructions that perform operations that include storing at least one property of a well casing in the subterranean formation. The instructions include determining a plurality of current source vectors at respective positions along a trajectory of the well casing, and determining the effect of the well casing based upon the plurality of current source vectors and the at least one property of the well casing.

DETAILED DESCRIPTION

Figure 1:
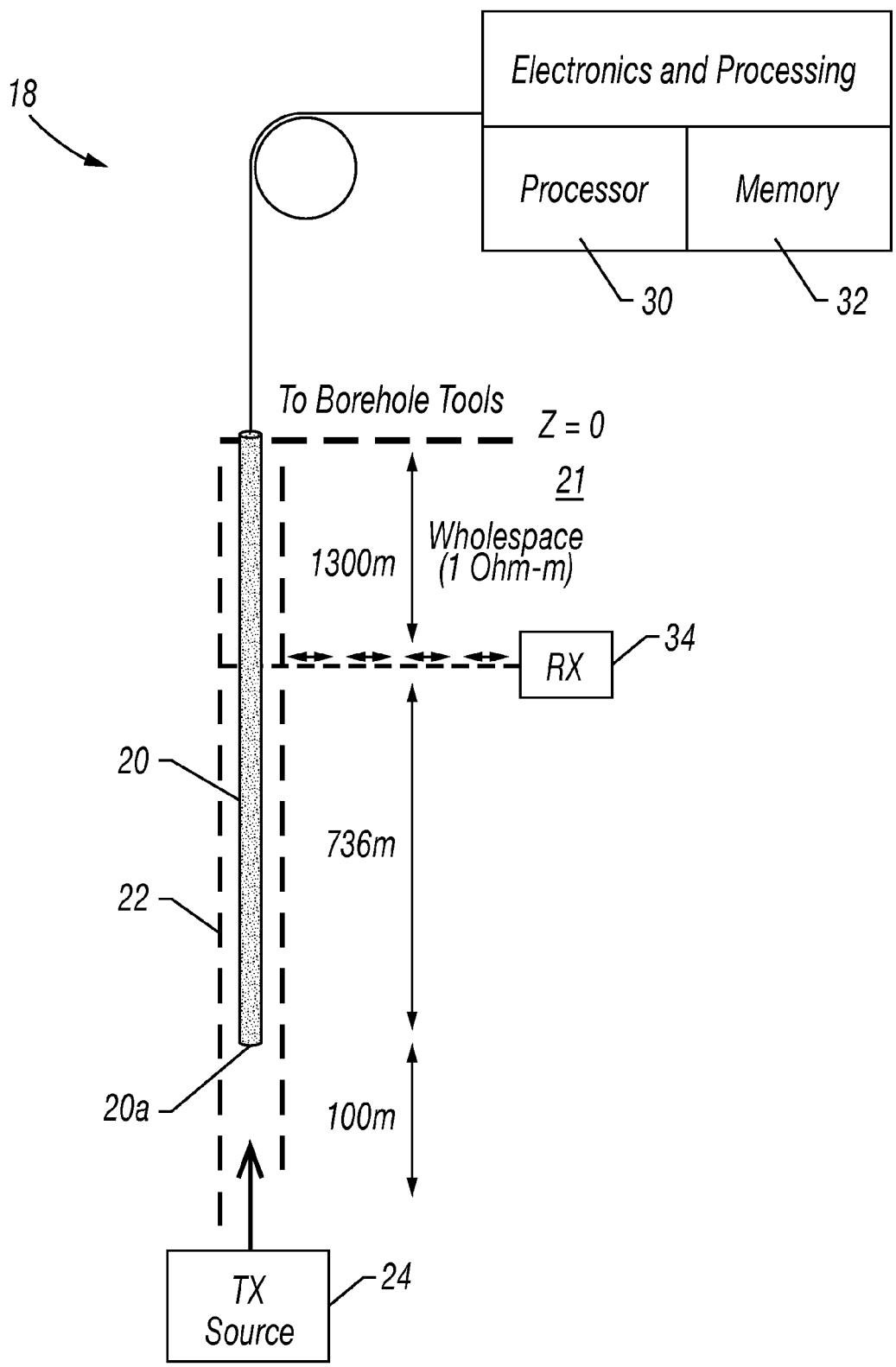
FIG. 1 is a schematic diagram of a system that analyzes a subterranean formation that may be used with the methodology in accordance with a non-limiting embodiment.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

This method as described below in accordance with a non-limiting example provides a technique to model the distortion caused by metallic casings in the earth by replacing the casing with an appropriate distribution of current sources. The current source distribution may be computed for the whole space case. For sources outside the casing as in surface to borehole, the calculation is numerical using an iterative method that is described below. The current source distribution may be numerically approximated for layered and 2-d cylindrical earth models. For higher dimensional earth models, the approach may be extended by using iterative or approximate rules to determine the strengths of the current sources. This approach allows the replacement of the casings with sources in the modeling that extends the class of models that can be addressed and interpreted.

Surface to borehole and borehole to surface electromagnetic measurements are sensitive to the presence of resistive targets. There are various examples of surface to borehole and borehole to surface numerical simulations where the response of the target provides an indication of the location of hydrocarbon reservoirs. Examples of these numerical simulations are found in Barnawal, V. C. and M. C. Sinha, 2009, 3-D Modelling Study of Borehole-Seafloor Marine CSEM for Shallow Water Case: 71st EAGE Conference & Exhibition, 5, 3175-3179; and Liu, H., Z. Wang, and Z. He, 2008, Frequency-Domain 3D Borehole-Surface Electromagnetic Modeling by the Volume Integral Equation Method: 70th EAGE Conference & Exhibition, the disclosures which are hereby incorporated by reference in their entirety.

A realistic experimental setting using numerical simulations will include the presence of the steel casing. This conducting medium yields current channeling along its vertical extent, which results in an additive contribution to the fields created by currents induced on and leaking out of the surface of the casing. The casing effect observed in the fields due to the VED inside an infinite casing can be described as a field due to a finite length antenna of an equivalent moment. This is described in Kong, F. N., F. Roth, P. A. Olsen, and S. O. Stalheim, 2009, Casing Effects in the Sea-to-Borehole Electromagnetic Method: Geophysics, 74, 5, F77-F87, the disclosure which is hereby incorporated by reference in its entirety.

The ratio between the moment of the source and that of an equivalent antenna is regarded as the casing attenuation factor, which has been found to increase with frequency. The screening effect of the casing may yield not a loss of signal, but also a loss of the resolution to the targets behind the casing. To preserve signal strength and resolution, an electric dipole source is located below the casing "shoe," corresponding to the lower section of the casing in the open section of the borehole. Experimental measurements have been conducted using the BSEM (borehole to surface electromagnetic) techniques where a vertical antenna is defined between a fixed surface as the negative pole and the positive pole located at variable depths below the casing shoe. This technique has been described in Marsala, A., M. Al-Buali, Z. Ali, S. Ma, Z. He, T. Biyan, T. He, and G. Zhao, 2011, First Pilot of Borehole to Surface Electromagnetic in Saudi Arabia—A New Technology to Enhance Reservoir Mapping & Monitoring: 73rd EAGE Conference & Exhibition, the disclosure which is hereby incorporated by reference in its entirety.

The fields recorded on receivers located on the surface are used to infer the structure of the subsurface conductivity and the induced polarization properties of the medium. However, in the results shown by Marsala et al. identified above, it is not clear how (or if) the presence of the casing distorts the fields measured using this technique. Further development in surface to borehole electromagnetic measurement techniques that take into account the distortion to electromagnetic fields caused by casing have thus been undertaken.

In one example, the electromagnetic fields arising in the vicinity of a steel casing in the surface to borehole configuration are corrected for the distorting effect of the casing. An equivalent source is defined which reproduces the effect of the casing and includes it as a superimposed source in a 3D modeling code. Using the reciprocal borehole to surface configuration of a vertical electric dipole (VED) source located below the casing shoe, it has been found that a discretized version of the current flowing in the pipe can be used to reproduce the effect of the casing. Numerical simulations determine the vertical dependence of the current induced on the casing. An array of vertical dipoles of varying moment are defined. The casing effect at a distant observation point is determined by integrating the fields due to the contribution of sources. Simulations show that the induced current attenuates exponentially from the bottom of the casing, which is closest to the source. A single equivalent vertical antenna describes the effect observed at far source-casing offsets. At close offsets, however, the strength of the field is dominated by the excitation of the currents flowing and leaking in the section of the casing closest to the observation point. Therefore, multiple sources are used to describe the effect at an offset from the pipe.

A similar borehole to surface configuration may be considered to study the distorting effect of the steel casing. A VED source is placed below the casing shoe and the receivers are defined below the surface in a radial profile at increasing distances from the casing. The casing effect is represented as the additive contribution to the fields, due to a source associated to the current induced in the casing.

Numerical simulations of the fields are performed by a controller or other processor and associated memory using a 2D code such as CWNLAT as a finite element code that simulates EM responses in the borehole with or without a conductive casing, in cylindrical coordinates, for an axial electric dipole source, and azimuthal symmetry of conductivity inhomogeneities. An example of the CWNLAT code or algorithm is found in WO2013/012967 assigned to Schlumberger Canada Limited, the disclosure which is hereby incorporated by reference in its entirety. In that example, the code assumes an axially symmetric model and source excitation and allows the casing and formation to be characterized and simulated by its conductivity, relative permeability and relative magnetic permeability. A background model is created and injected fluid is modeled as a doughnut-shaped region. It has the same conductivity but different relative magnetic permeability as a host layer.

In the example of numerical simulations of the fields using CWNLAT, throughout the analysis, the VED source frequency of excitation and the properties of the casing remain constant. The frequency is 10 Hz and the casing properties are: $\sigma c=5.5-106$ (S/m), $\mu=100\mu 0$, inner radius $a=3.8$ (in) and outer radius $b=4.2$ (in).

There now follows a description of the casing effect as a function of transmitter-receiver geometry and formation conductivity. In addition, the current induced on the casing is analyzed in light of the effective antenna proposed by Kong et al. identified above to justify the equivalent dipole source method as described. Also, the equivalent source is tested assuming different scenarios for the conductivity structure.

There is a casing effect to be considered. Referring now to FIG. 1, there is illustrated at 18 a system for analyzing a subterranean formation in accordance with a non-limiting example. A finite length casing 20 is embedded in an otherwise homogeneous whole space 21 of conductivity $\sigma=1$ S/m. The origin of the coordinate system coincides with the top end of the casing 20, and the vertical axis increases (Z>0) downwards. A transmitter source 24 is located in this example below the well casing. A downhole tool is not shown, but inserted within the wellbore shown by the dashed lines 22 and through the casing 20. A downhole tool connects via a wireline or other technique to electronics that includes a processor 30 and associated memory 32. A receiver 34 receives signals from the source 24. The receiver 34 can be located radially offset from the source.

Figure 2A:
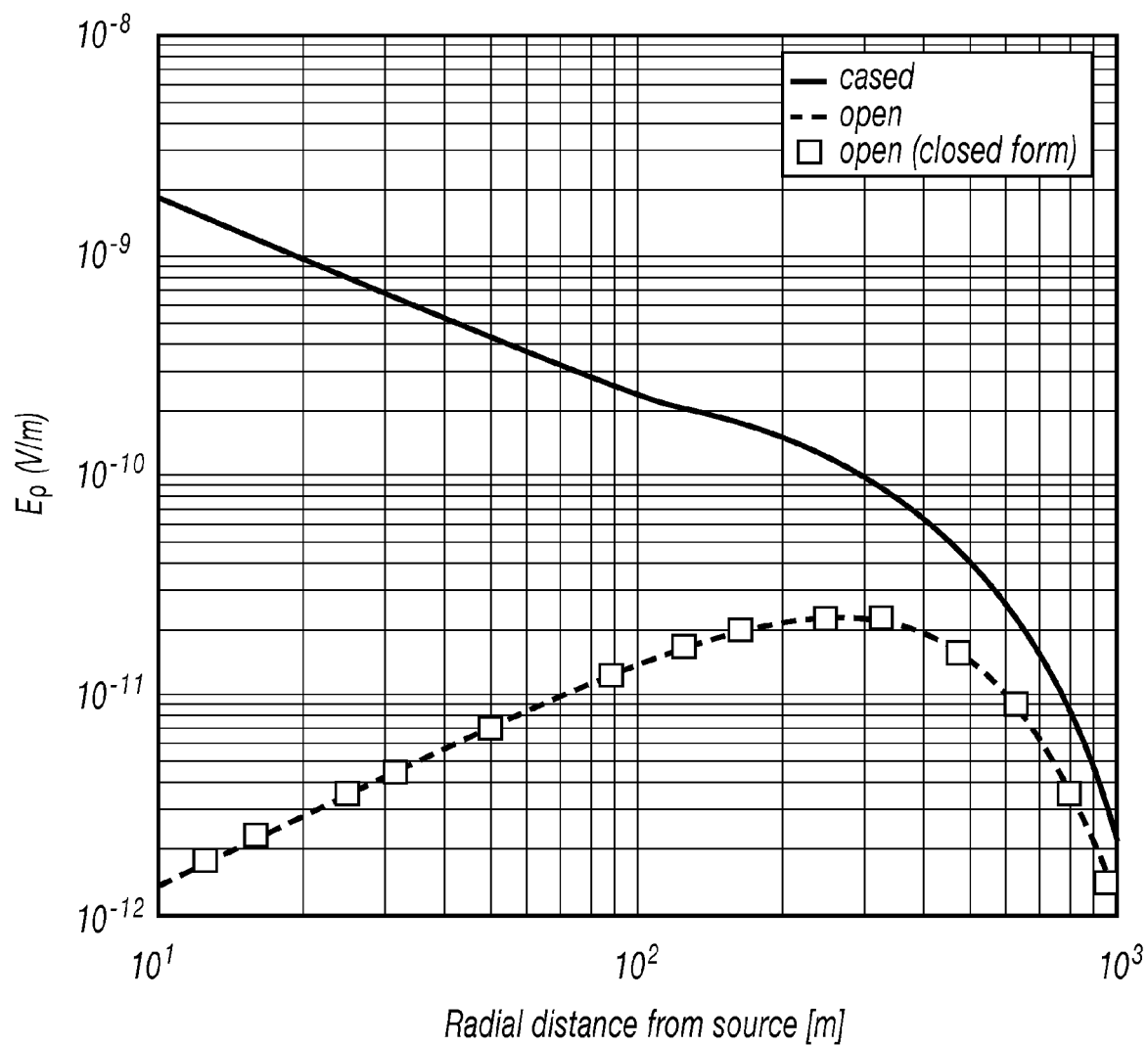
FIGS. 2A and 2B are graphs showing a radial component of the electric field as a function of radial distance for a vertical electric dipole (VED) source located 10 meters below the casing as in FIG. 2A and 100 meters below the casing as in FIG. 2B.
Figure 2B:
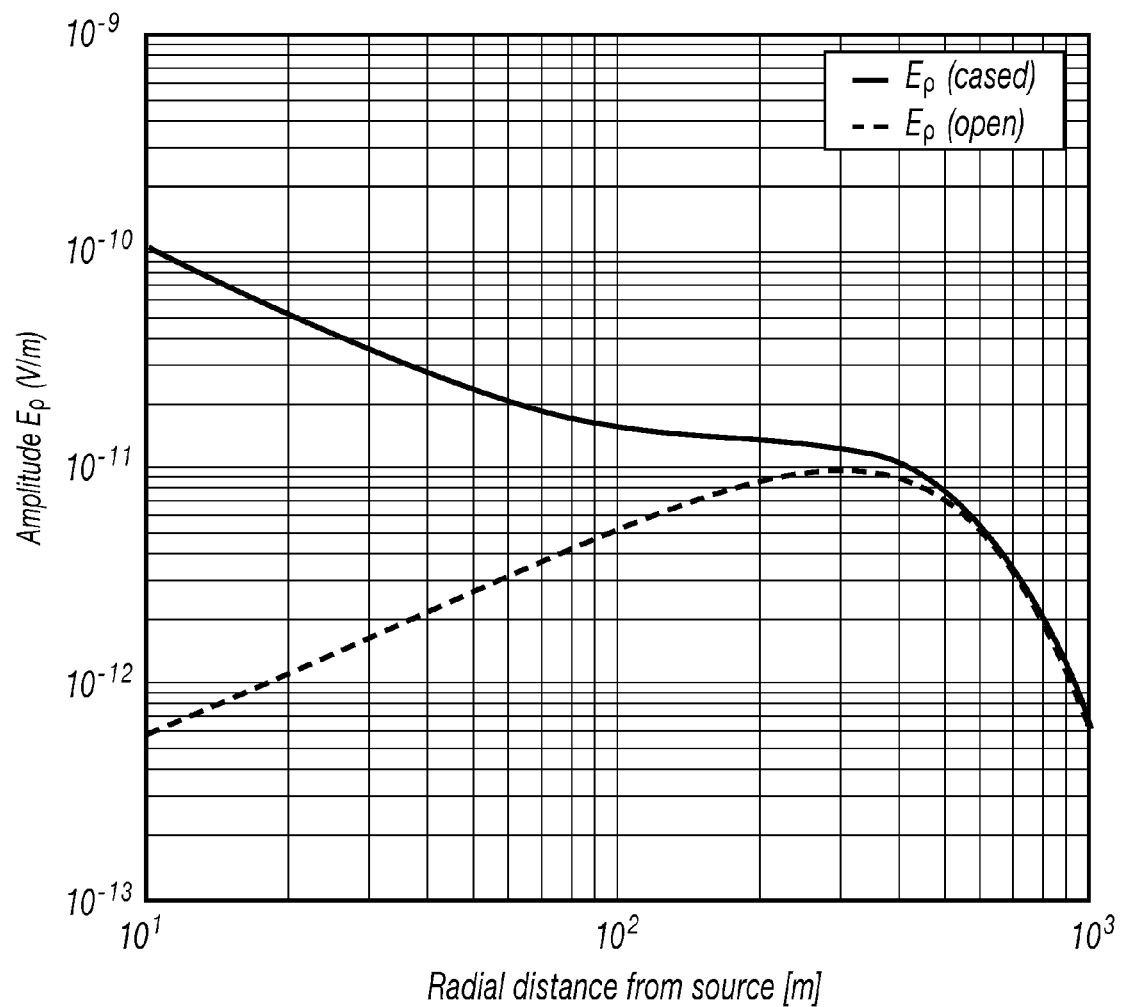

The horizontal profile (at z~1300 m, for the dashed line in FIG. 1) of the radial component of the electric field $E_{r}$ is shown in FIG. 2A, the case where the VED source is located about 1 meter below the casing 20, and in comparison to the field observed in an open hole setting. The radial electric field increases as the observation position approaches the casing 20 and it remains stronger than the open hole field even at radial offsets greater than 1 km. It is expected that as the source departs from the casing shoe 20a located at the bottom of the casing 20, however, the amplitude of the effect should decrease and drop below the primary source field, which may dominate at some radial offset. This is shown in the graph of FIG. 2B where the source is located about 100 meters below the casing shoe 20a.

Figure 4A:
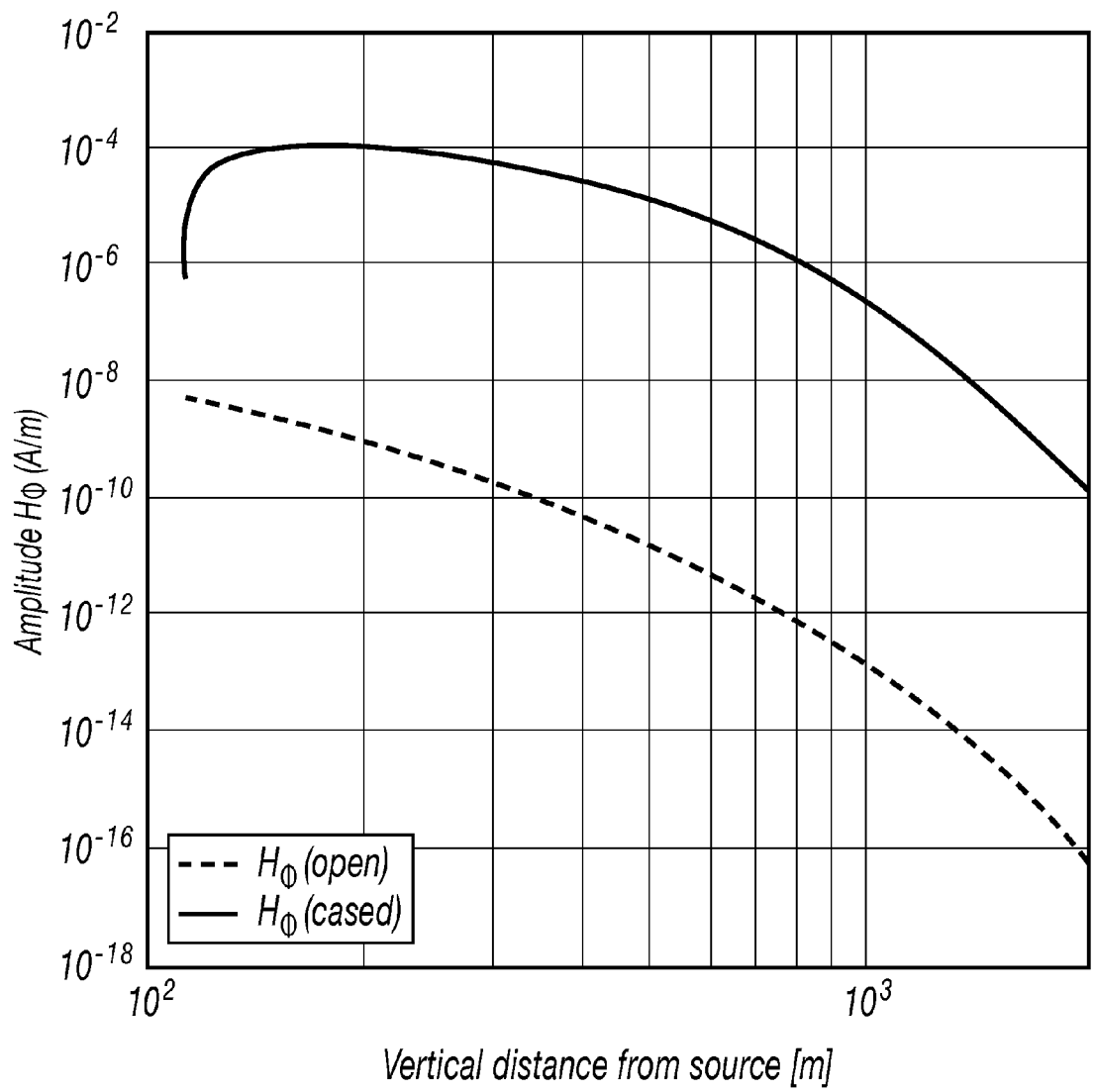
FIGS. 4A and 4B are graphs showing a secondary magnetic field on the surface of the casing plotted as a function of the vertical distance to the VED source as shown in FIG. 4A and due to current flowing vertically in the casing as shown in FIG. 4B.

There is an induced casing current. The strong radial field observed near the casing 20 can be explained by the current leaking radially outwards from the casing. Current is expected to channel vertically in the casing 20. The non-divergent condition of the current density ($\nabla \cdot J=0$), however, causes the current to decrease away from the casing 20, towards the conductive surroundings, which provide a leakage path. The portion of the current flowing vertically on the casing 20 induces an azimuthally symmetric secondary magnetic field. FIG. 4A is a graph showing the field observed on the surface of the casing 20 plotted as a function of the vertical distance to the source 24 (solid line) in comparison to the same field observed in an open hole scenario (dashed lines).

Figure 3:
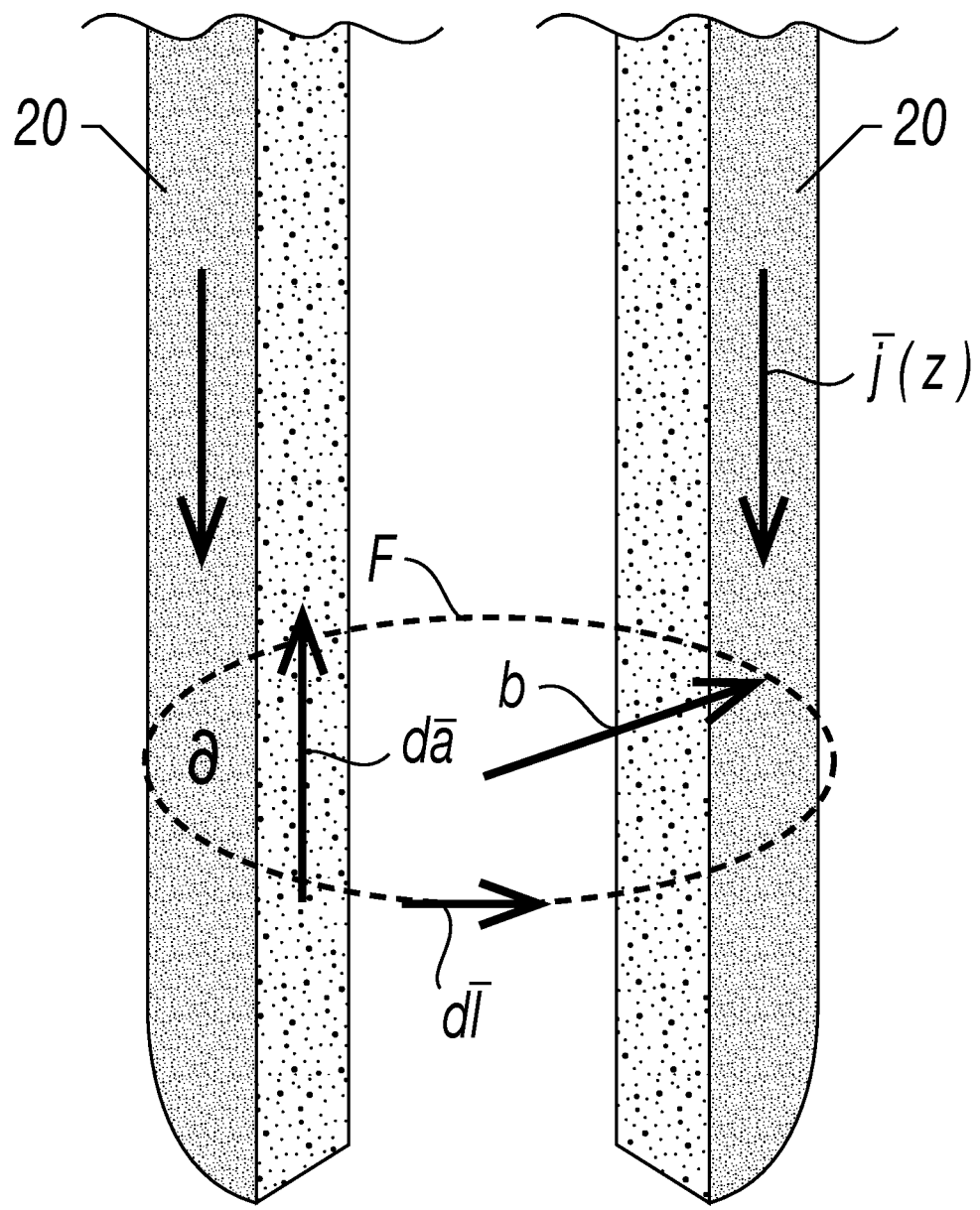
FIG. 3 is a perspective view of a cut-away section of the casing showing the magnetic field that is coincident with the surface of the casing.
Figure 4B:
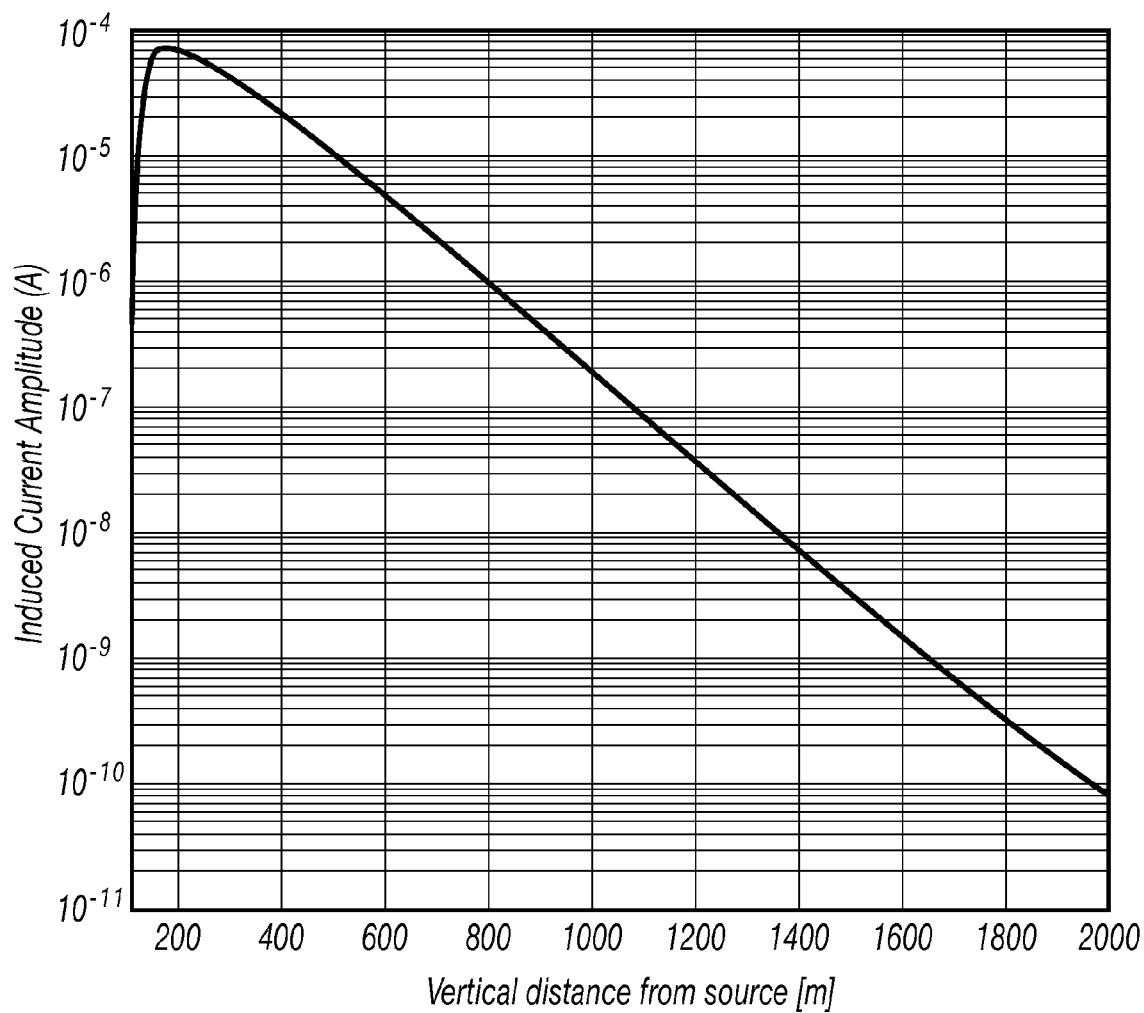

The field observed in the surface of the casing 20 satisfies Ampere's law:

$$\nabla \times H = J \quad (1)$$

and therefore Stoke's theorem:

$$\int_{\partial}(\nabla \times H) \cdot da = \oint H \cdot dl = \int_{\partial} J \cdot da = i \quad (2)$$

provides a way to compute the amplitude of the current flowing down the casing 20 by the circulation of the azimuthal component of the magnetic field as shown in FIG. 3, which shows the circulation of the magnetic field in a circuit that is coincident with the surface of the casing 20, yielding the electric current flowing along the casing. Because of the azimuthal symmetry of the magnetic field, the current may be calculated by:

$$i = 2\pi b (H \cdot \hat{\phi}) \quad (3)$$

where b is the outer radius of the casing. In the graph of FIG. 4B, the amplitude of the current is shown as a function of the vertical distance to the source 24, which is located about 100 meters below the casing 20, which corresponds with the magnetic field shown in the graph of FIG. 4A. As expected, the current builds up near the bottom of the casing 20 and it decreases away from the bottom end due to leakage to the surrounding formation.

An effective dipole array is formed. Since the current channeled down the casing 20 is a piecewise continuous function of Z, the secondary field due to the casing current can be obtained by integrating the field due to infinitesimal dipole sources with a moment which varies with Z within the length of the casing L. Formally, this can be represented as:

$$E = \int_0^L i(z')e(r-z'\hat{z})dz' \quad (4)$$

where $e(r-z'\hat{z})$ is the field at r due to a vertical unit dipole source located at z', and i(z')dz' is the moment of a dipole source of infinitesimal length (dz') due to the current flowing in the pipe at z'. In practice, the current function is numerically evaluated at discrete intervals ($\Delta z'$) along the casing length, and the fields are obtained by superposing the fields computed assuming unit moment sources, weighted by the moment $i(n\Delta z')\Delta z'$ of the source located at a distance $n\Delta z'$ from the casing top end ($n\Delta z' = \Delta z', \ldots, L$). The array of dipole sources describes the casing effect and therefore the total field is computed by superimposing the field due to the primary source and that due to the effective dipole array source.

There is the example of the steel casing 20 embedded in a homogeneous whole space 21 as shown in FIG. 1. To obtain the equivalent total field, due to the primary source and effective dipole array, an example method may be used: 1) the estimate of the casing current, $i(n\Delta z')$, is obtained using the 2D cylindrically symmetric numerical code; 2) the field due to a unit dipole moment in a whole space is determined using the closed form solution described in Ward and Hohmann, Electromagnetic Theory for Geophysical Applications: Electromagnetic Methods in Applied Geophysics, SEG Investigations in Geophysics, 1, 131-311, the disclosure which is hereby incorporated by reference in its entirety:

$$e_x = \frac{1}{4\pi\sigma R^3} e^{-ikR} \frac{(z-n\Delta z')x}{R^2}(-k^2R^2 + 3ikR + 3) \quad (5)$$

$$h_y = \frac{1}{4\pi R^2} e^{-ikR} \frac{x}{R}(1 + ikR)$$

for each source located at $n\Delta z'$, distant $R = \sqrt{x^2+y^2+(z-n\Delta z')^2}$ from the observation point; 3) the secondary field is obtained by superimposing the contributions in equation (5) weighted by the moment of each source $i(n\Delta z')\Delta z'$; 4) the total field is obtained by adding the primary field, which is also obtained using the equation in (5), with the appropriate source position.

Results are shown in FIGS. 5A-5D for the example where the primary source 24 is located about 100 meters below the casing 20. The whole space primary field 21 is shown in the dotted lines in these graphs, while the total field estimated using the 2D code is shown in the solid lines. The secondary field due to the dipole array is shown in crosses and the total equivalent field, i.e., the primary plus the secondary, is shown in the dashed line. The agreement in the field's amplitude computed numerically (solid line) and by the equivalent source method (dashed line) is evident as in FIG. 5A and FIG. 5C for the radial electric and azimuthal magnetic fields respectively.

Figure 5A:
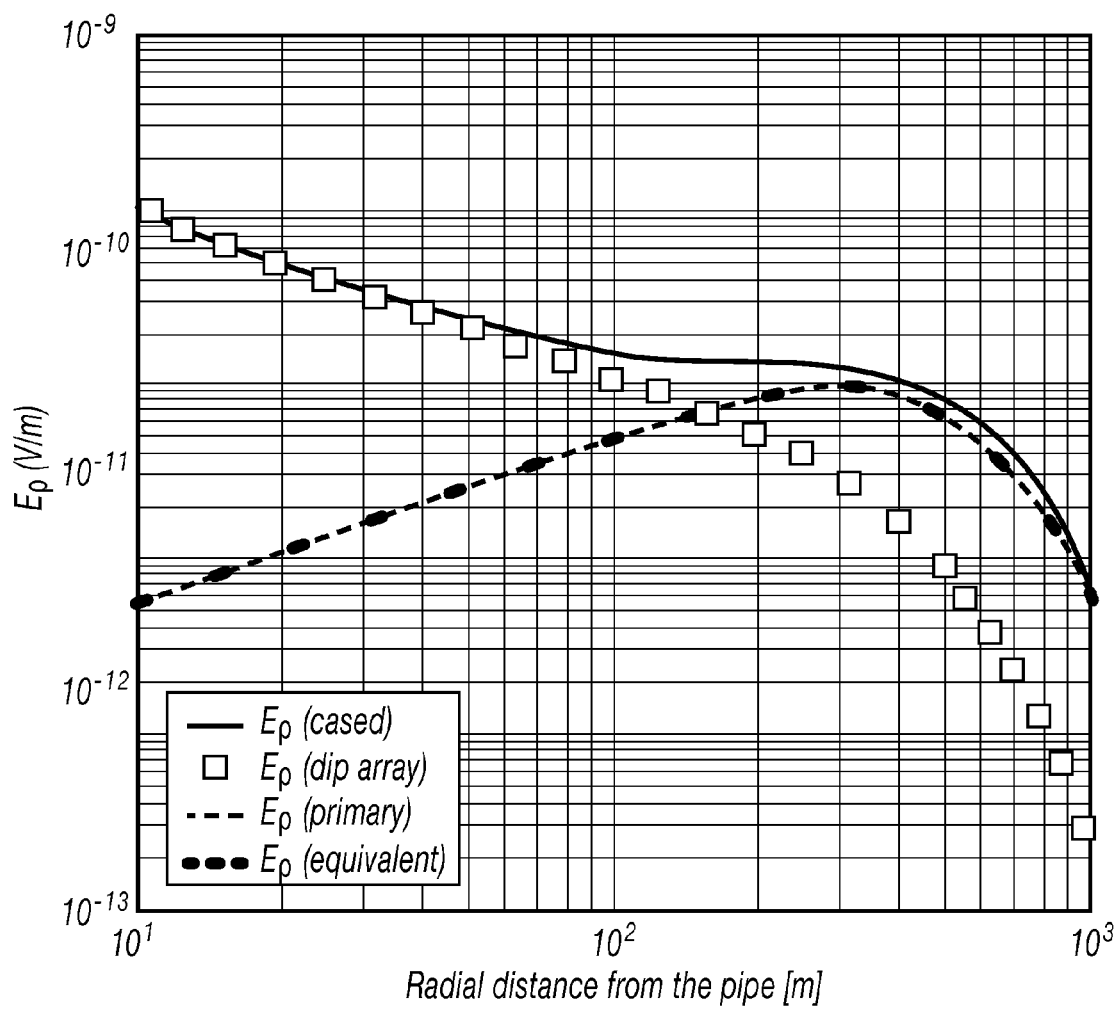
FIGS. 5A-5D are graphs showing the field due to the dipole array and showing the amplitude of the radial electric in FIG. 5A and the azimuthal magnetic in FIG. 5C and the phase in FIGS. 5B and 5D respectively for the fields observed as a function of the radial distance from the casing and assuming the transmitter source is 100 meters below the casing.
Figure 5B:
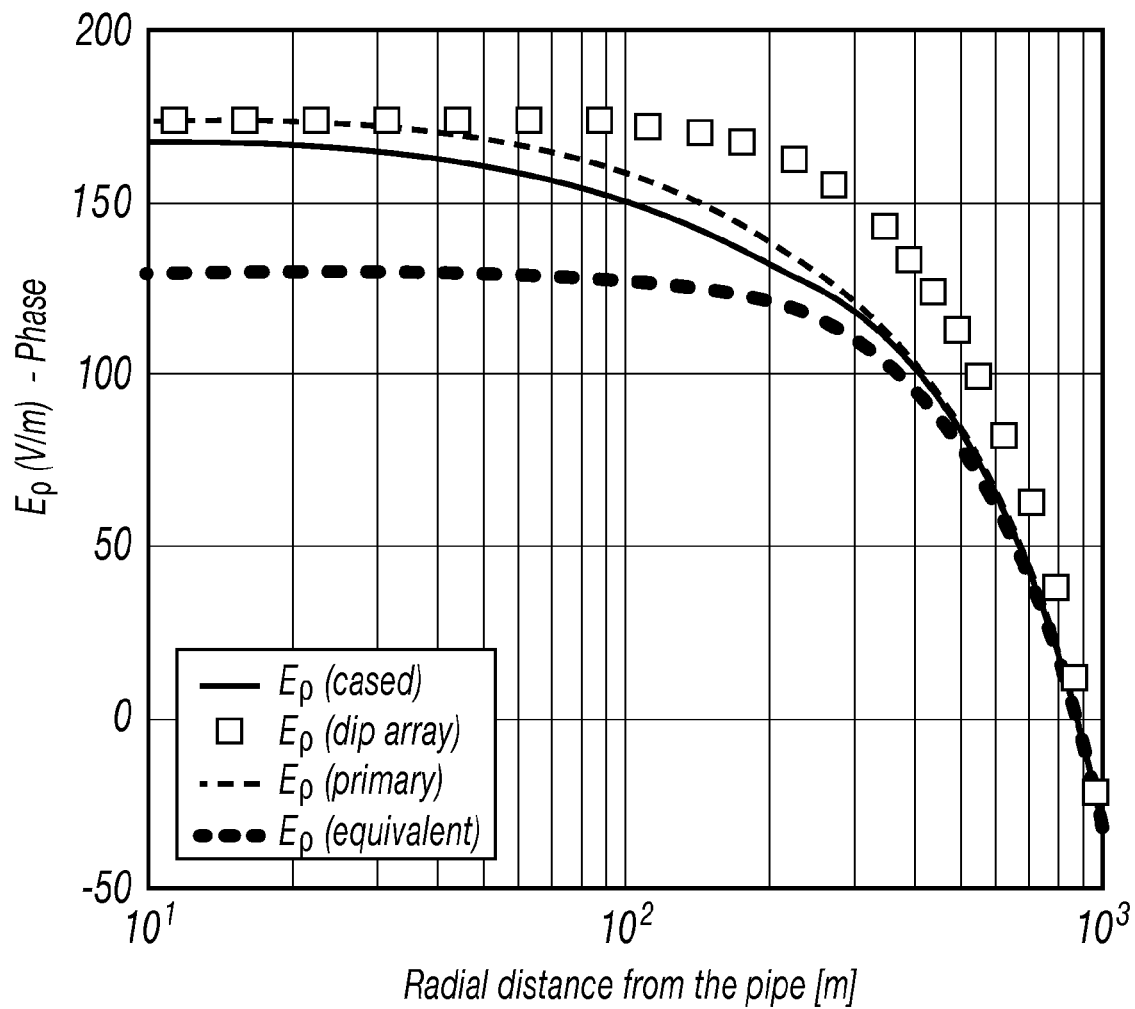
Figure 5C:
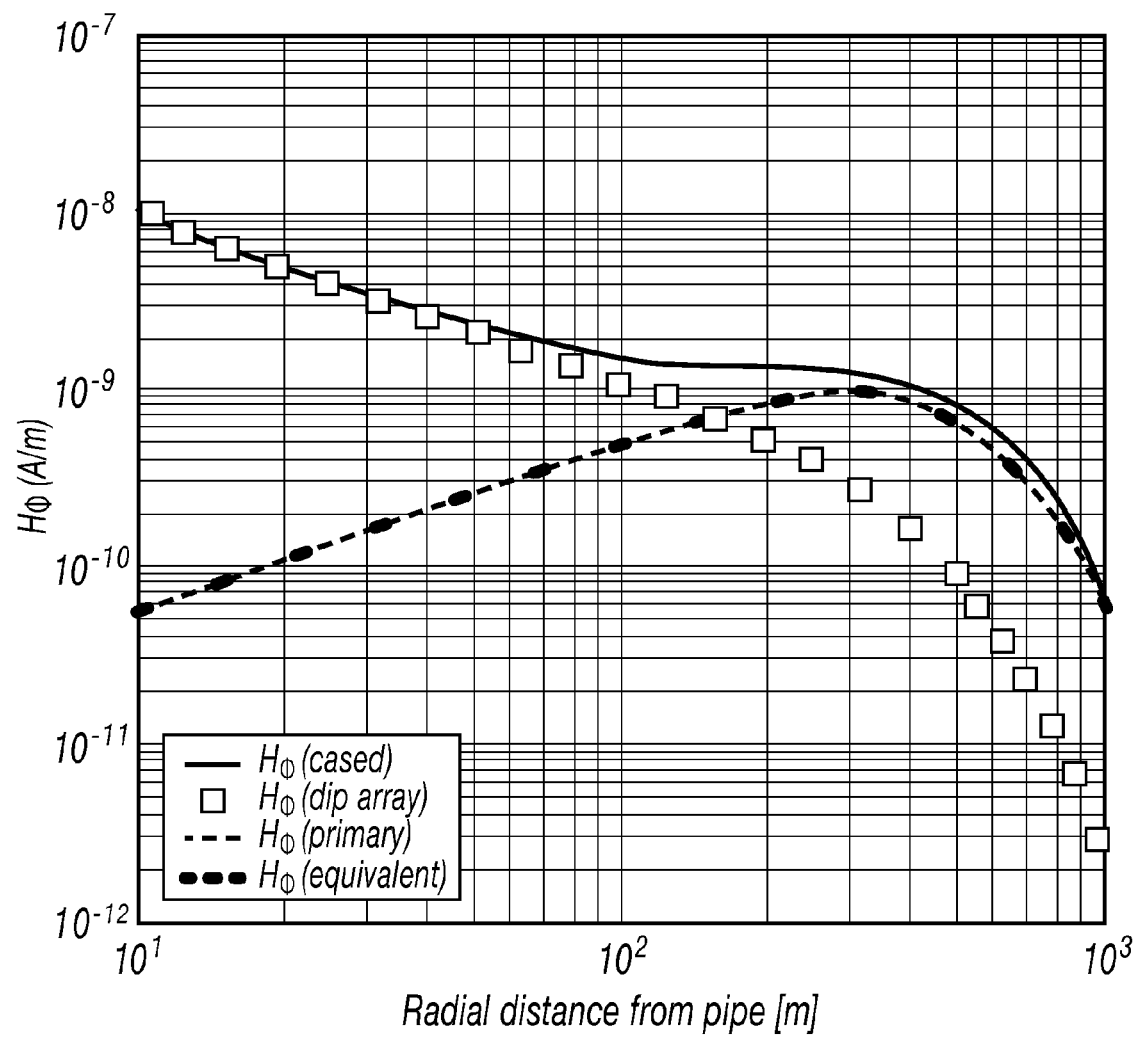
Figure 5D:
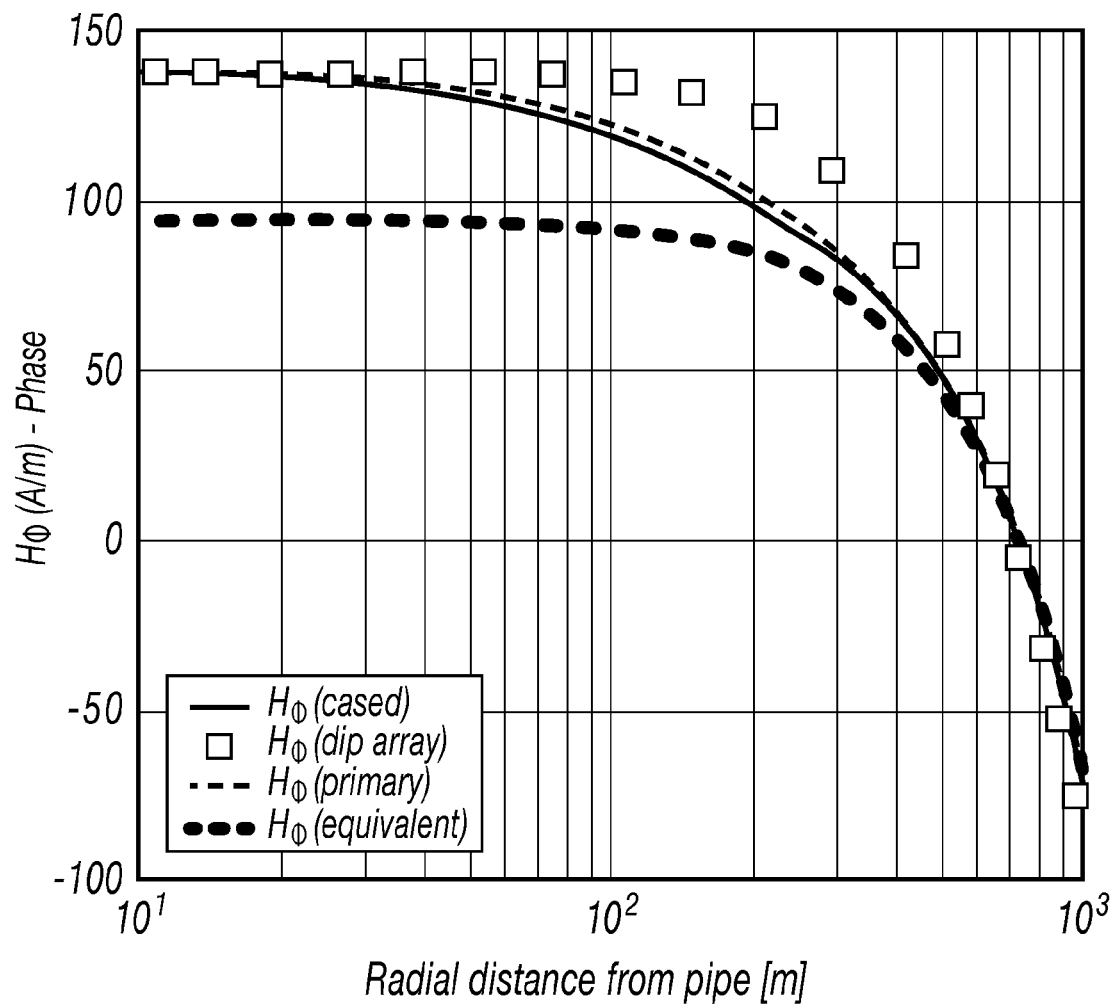
Figure 6A:
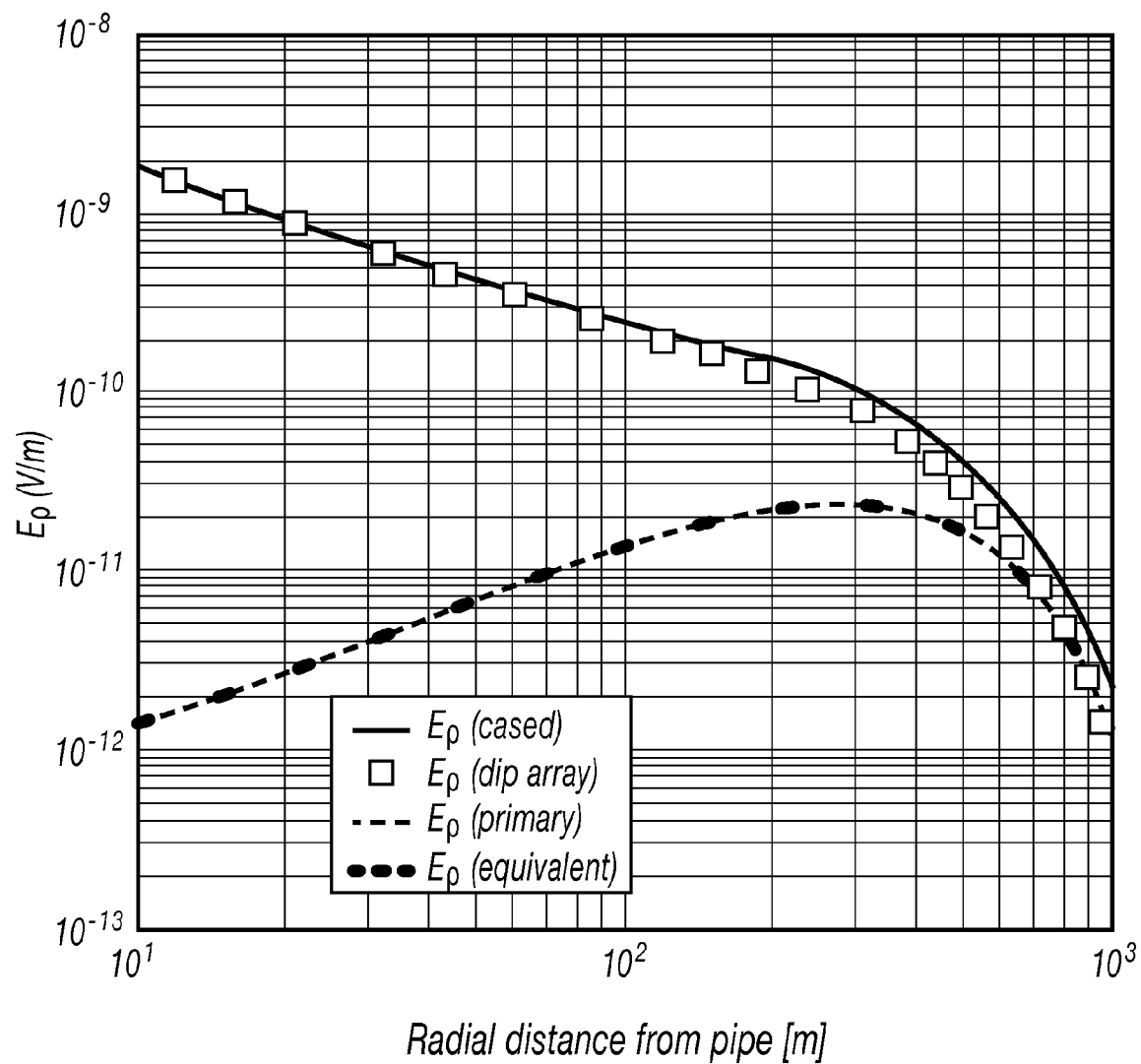
FIGS. 6A-6D are graphs similar to the graphs shown in FIGS. 5A-5D but showing results when the source is about 10 meters below the casing.
Figure 6B:
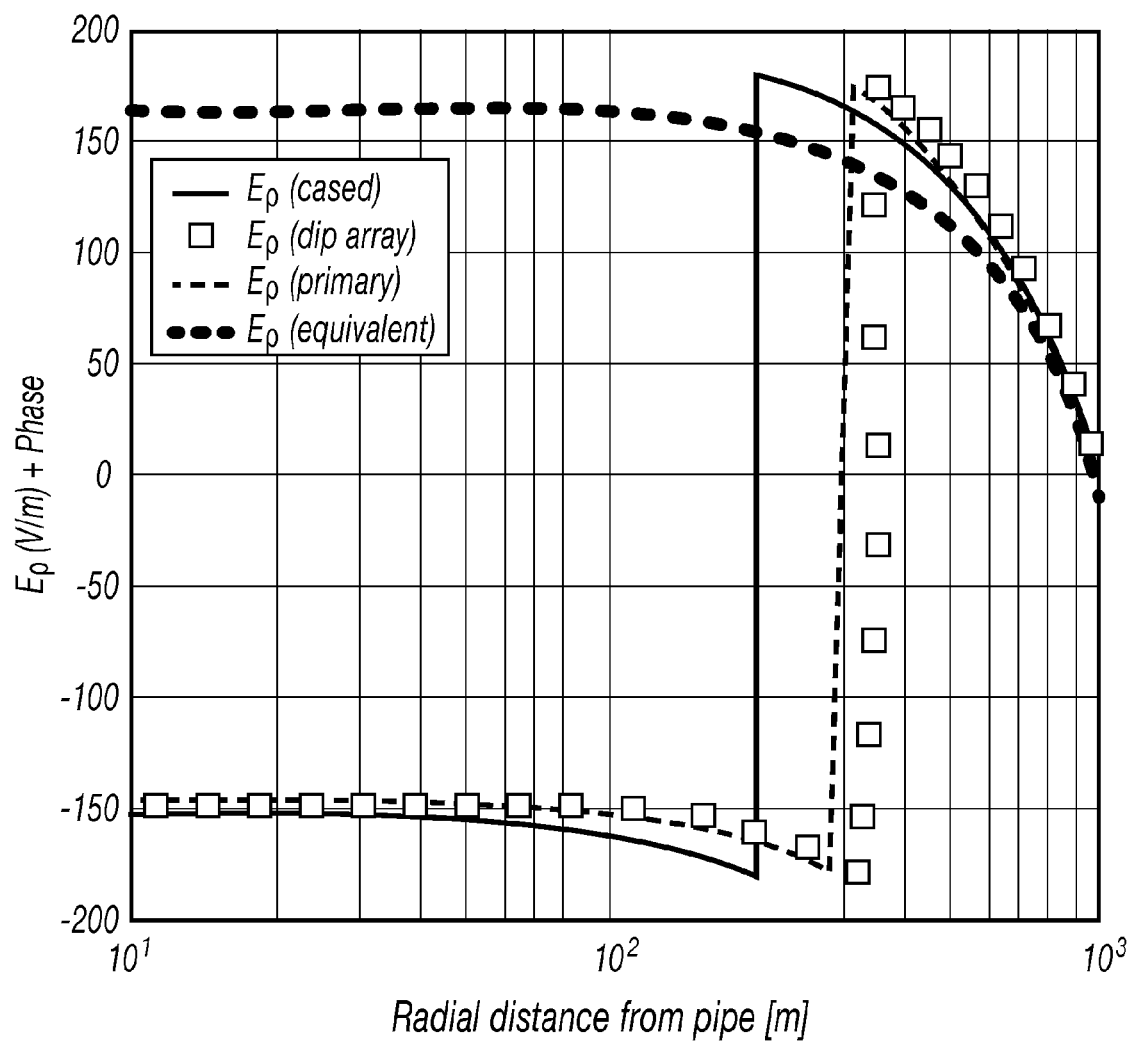
Figure 6C:
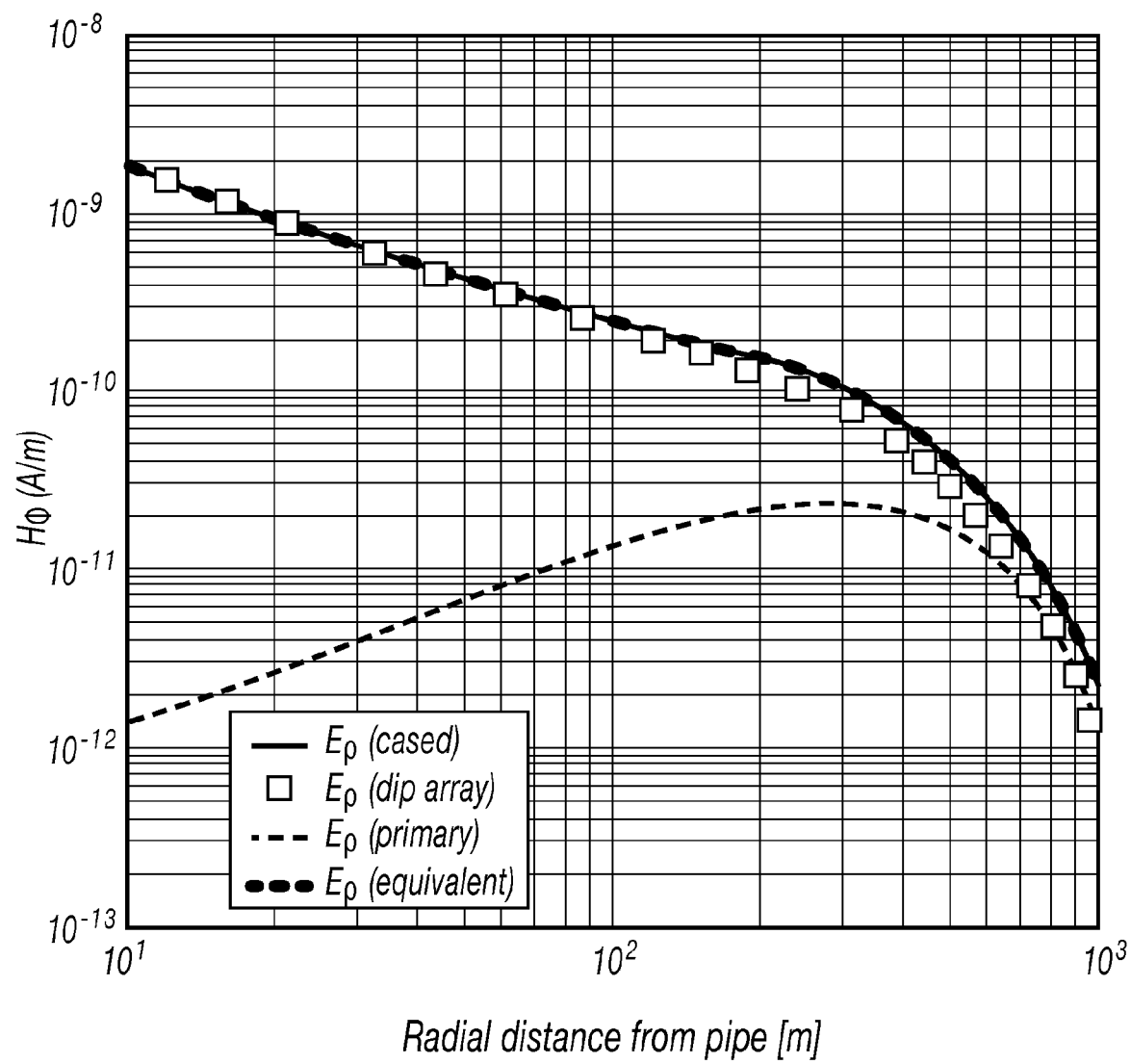
Figure 6D:
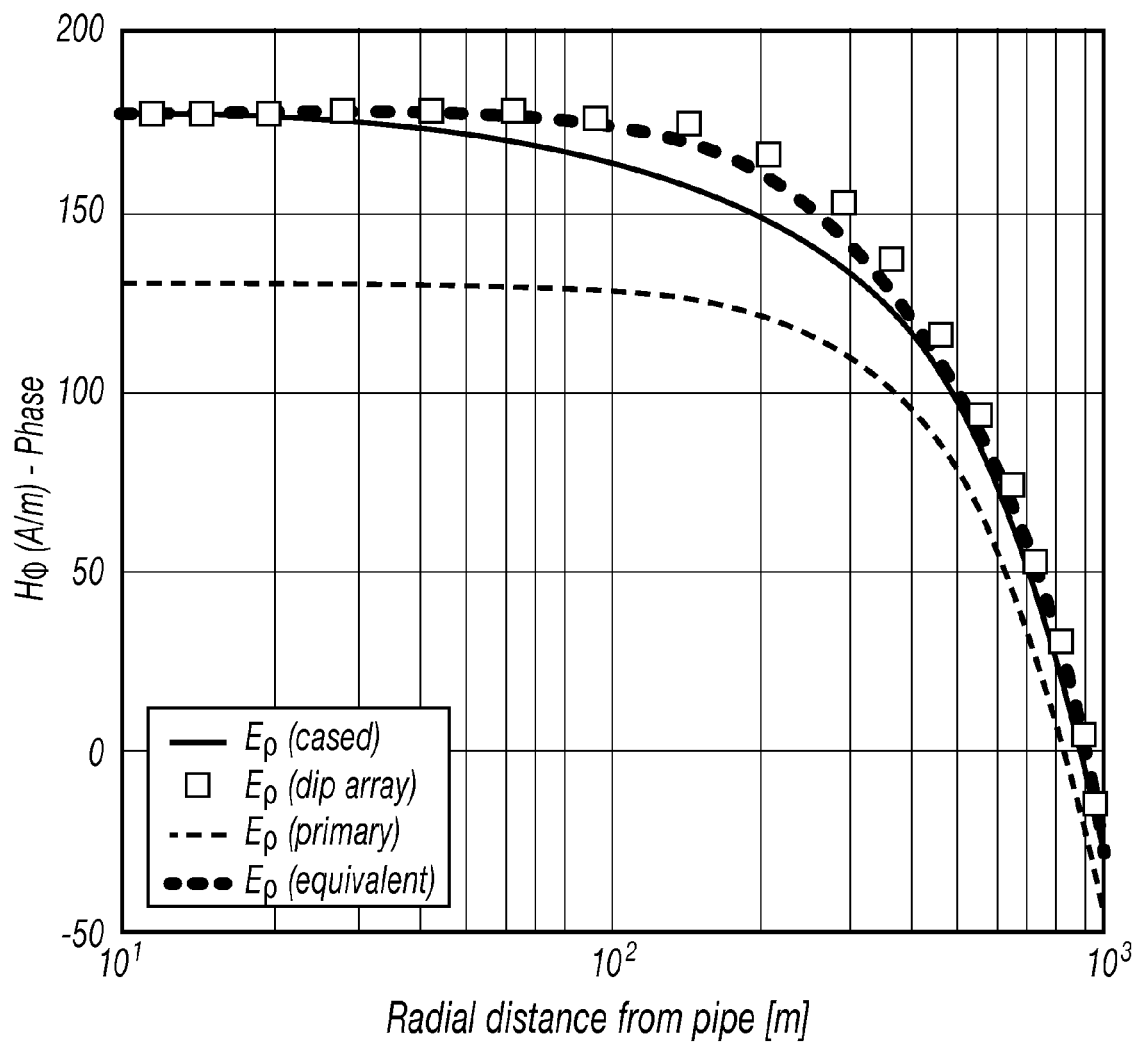

The phase is reconstructed at the far offsets (greater than 300 meters). At close offset from the casing (less than 50 meters), however, the phase of the azimuthal magnetic field is accurate to better than about 2 degrees, but the radial component of the electric field computed by the equivalent source over estimates the phase by about 5-10 degrees with respect to that computed numerically as shown in FIG. 5B and FIG. 5D. At mid offsets (about 100 meters), both the electric and magnetic field components differ by about 5-10 degrees from their respective numerical estimates. The same general behavior remains in a scenario in which the primary source is located 10 meters below the casing shoe as shown in FIGS. 6A-6D. These graphs show the agreement is observed in the amplitude of the field computed numerically (the solid line) and by means of the equivalent source method (the dashed line), while the phase reconstruction shows varying degrees of matching with respect to the numerical estimates. The error in the estimate of the phase is smaller at far offsets from the casing 20. This suggests that the uncertainty is related to inadequate discretization of the physical model, which in turn yields numerical inaccuracies in the estimates of the fields.

It is possible to assume that the complex current function i(z') is estimated with an small error in the phase, $\phi(z') \ll 1$ degree (i.e. $\phi(z') \sim 10\text{-}2$ rad). The phase of the current function is approximated by:

$$\theta \sim \arctan\left(\frac{\operatorname{Im}(i(z'))}{\operatorname{Re}(i(z'))} + \varphi(z')\right) \sim \frac{\operatorname{Im}(i(z'))}{\operatorname{Re}(i(z'))} + \varphi(z') \qquad (6)$$

The error in phase accumulates as the superposition integral in equation (4) above is carried out along the length of the casing 20. As the mesh degrades away from the bottom of the casing 20, it is expected that inaccuracies in the estimates of the fields increase with increasing vertical distance from the casing shoe 20a at the bottom of the casing. As a result, the error in the estimate of the current function will be higher at depths closer to the measurement plane, thereby accumulating to a higher inaccuracy in the contribution to the fields observed at close radial offsets from the pipe, i.e., r<100 m, z'→z=1300 m, as shown in FIG. 1.

Figure 7:
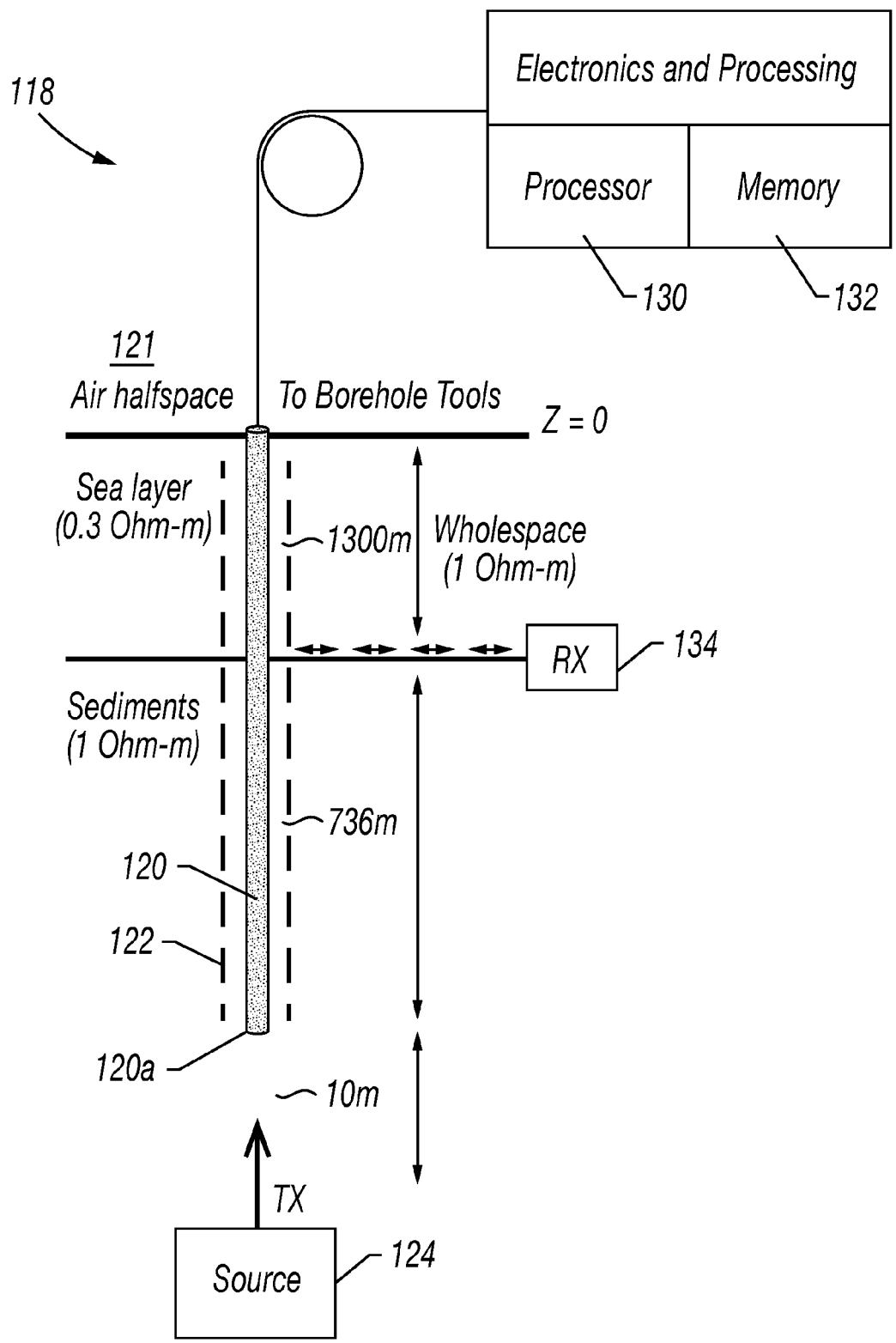
FIG. 7 is a schematic diagram of the system similar to that shown in FIG. 1 when the source is about 10 meters below the casing and receivers are placed above the seafloor.

There is also an effect from the sea layer. A marine borehole to surface system 118 is shown in FIG. 7. Reference numerals are similar to those of FIG. 1, but in the 100 series. The source 124 is located about 10 meters below the casing shoe 120a, and the receivers 134 are located above the seafloor (about 50 meters). The casing 120, wholespace 121, processor 130 and memory 132 are similar as in FIG. 1. In a marine surface to borehole reciprocal case, however (not shown), a source is dragged behind the boat and receivers are located in the borehole. The source 124 is logistically easier to implement. The antenna may not require redeployment of electrodes each time the source is moved to a new location, which is the case in land surface CSEM surveys. The equivalent total field is computed as in the previous case. A semi-analytical formulation may be used to compute the field due to a dipole embedded in a layered medium.

Figure 8A:
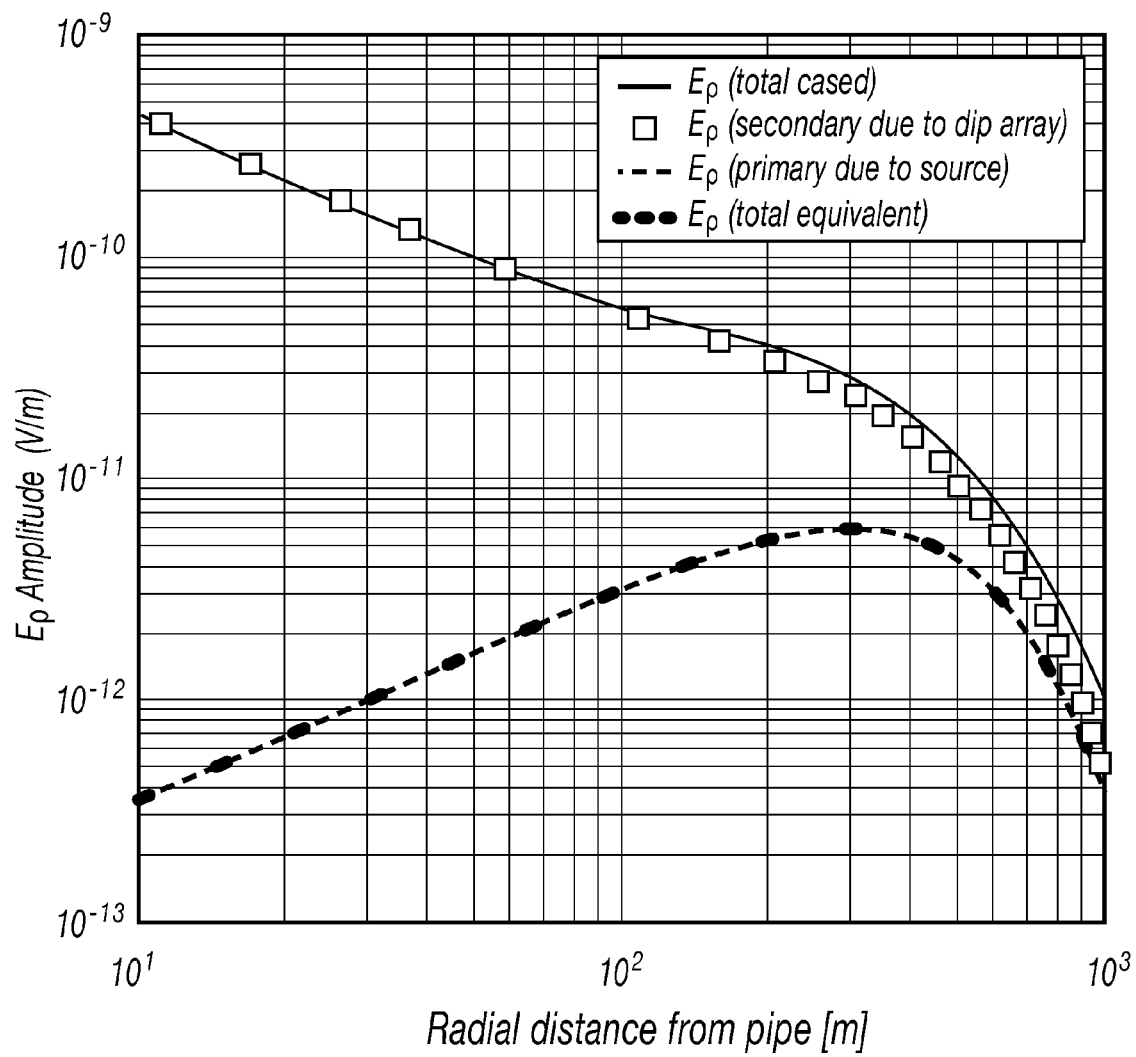
FIGS. 8A and 8B are graphs showing the amplitude in FIG. 8A and the phase in FIG. 8B of the radial electric field observed as a function of radial distance from the casing when the source is about 10 meters below the casing and receivers are located above the seafloor.
Figure 8B:
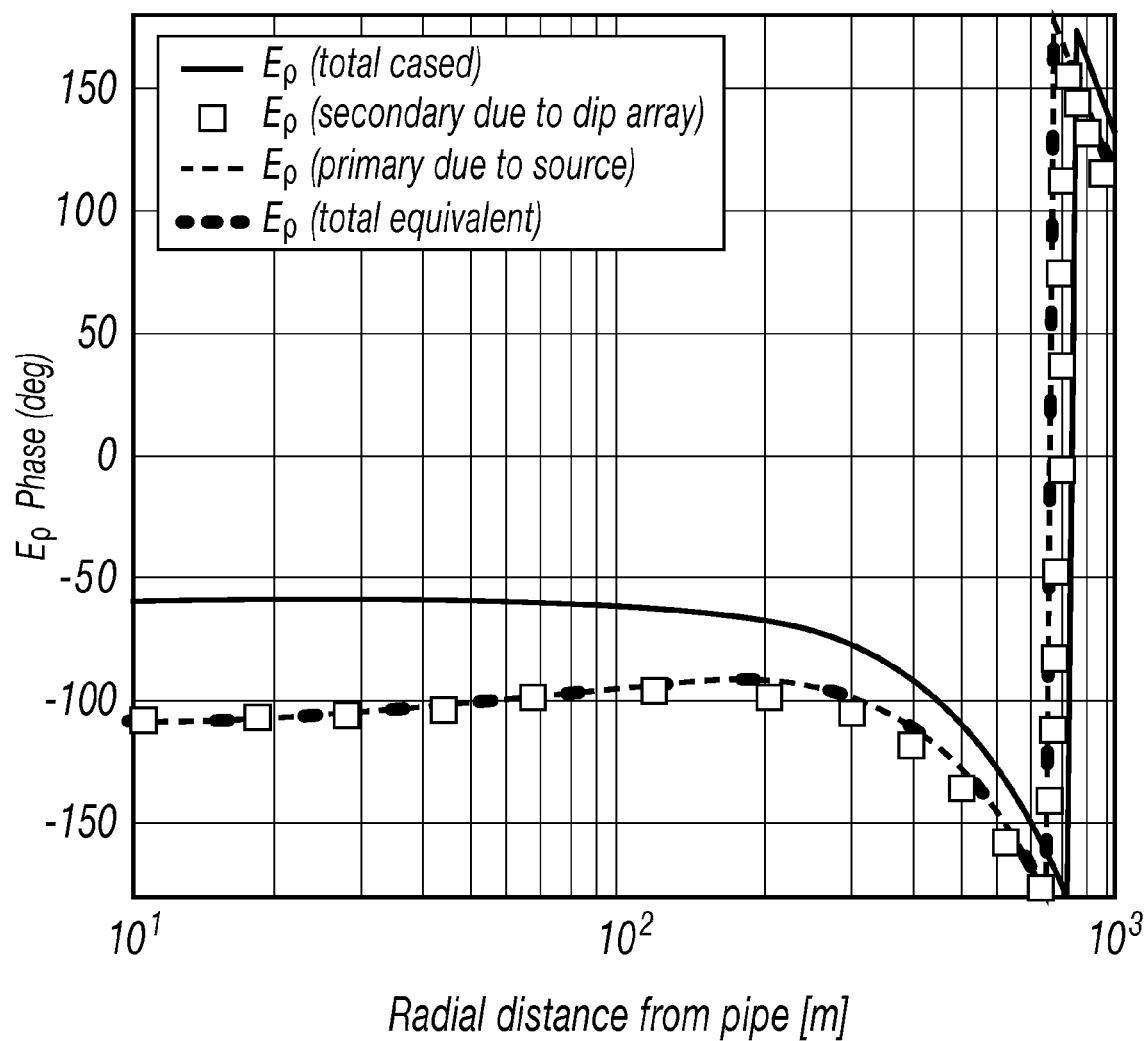

The radial electric field observed on the seafloor, which is reconstructed using the equivalent dipole array is shown in the graphs of FIGS. 8A and 8B (dashed line), in comparison to that obtained numerically (solid line). The agreement in both the amplitude and phase is evident. As the current density attenuates more rapidly in the conductive water body 120, the contribution of those sources in this portion of the casing becomes negligible and thereby inaccuracies in the current density due to insufficient discretization are not as important as in the previous example.

Figure 9:
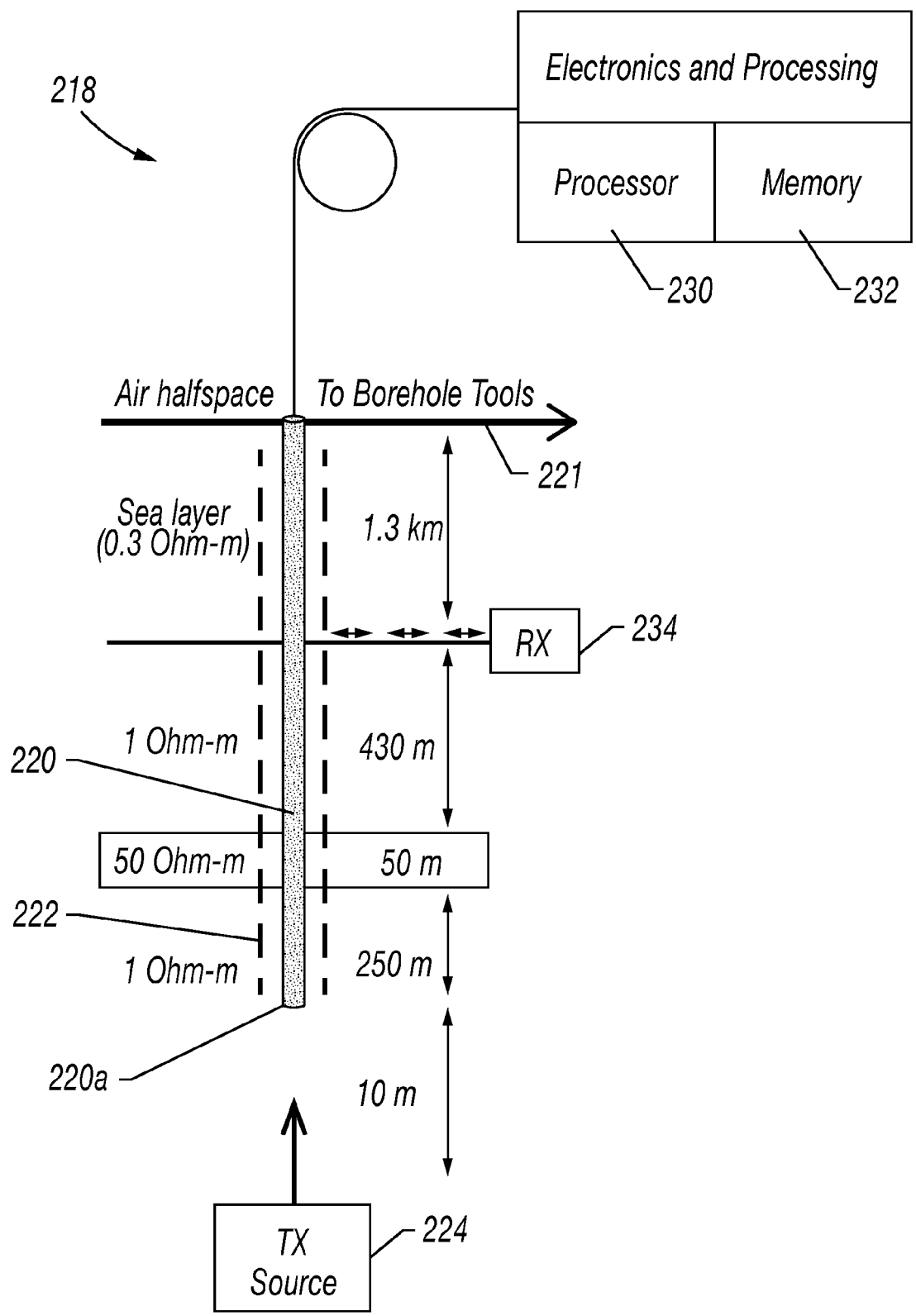
FIG. 9 is another schematic diagram similar to that shown in FIG. 1 and showing a marine borehole to surface system with a resistive layer at depth and receivers placed above the seafloor and the source located about 10 meters below the casing.

There is an effect at a resistive layer 250 as shown in the example of the system 218 shown in FIG. 9. The scenario of the previous explanation relative to FIG. 7 is modified to include a resistive (50 Ωm, 50 meters thick) layer 250 at depth, as shown in the example of FIG. 9. Similar components in FIG. 7 are shown in FIG. 9, but given the 200 series of references, but with a resistive layer 250 shown in FIG. 9.

Figure 10:
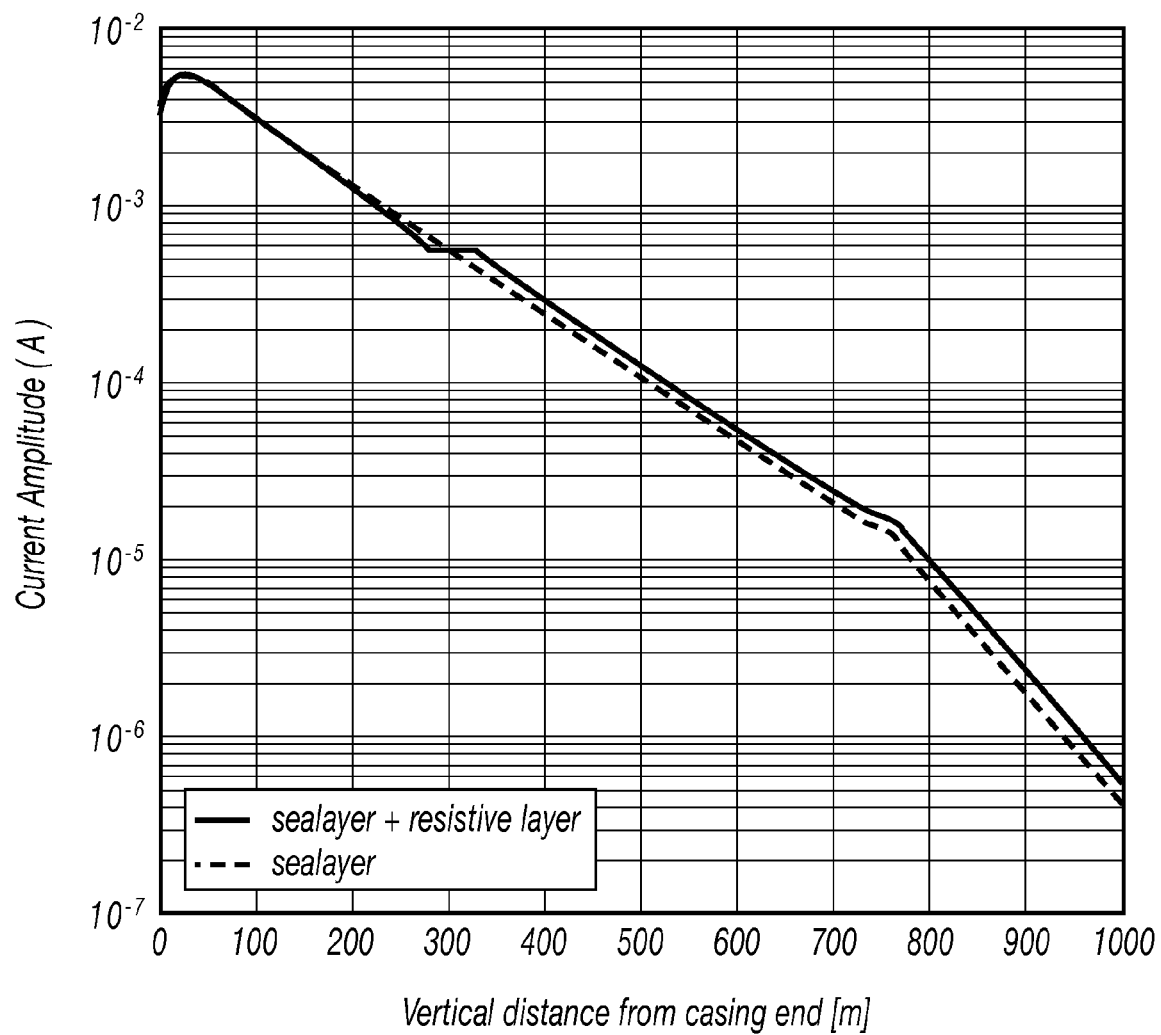
FIG. 10 is a graph showing the current amplitude flowing in the casing as a function of depth, with (solid line) and without (dashed line) the presence of a resistive layer.
Figure 11A:
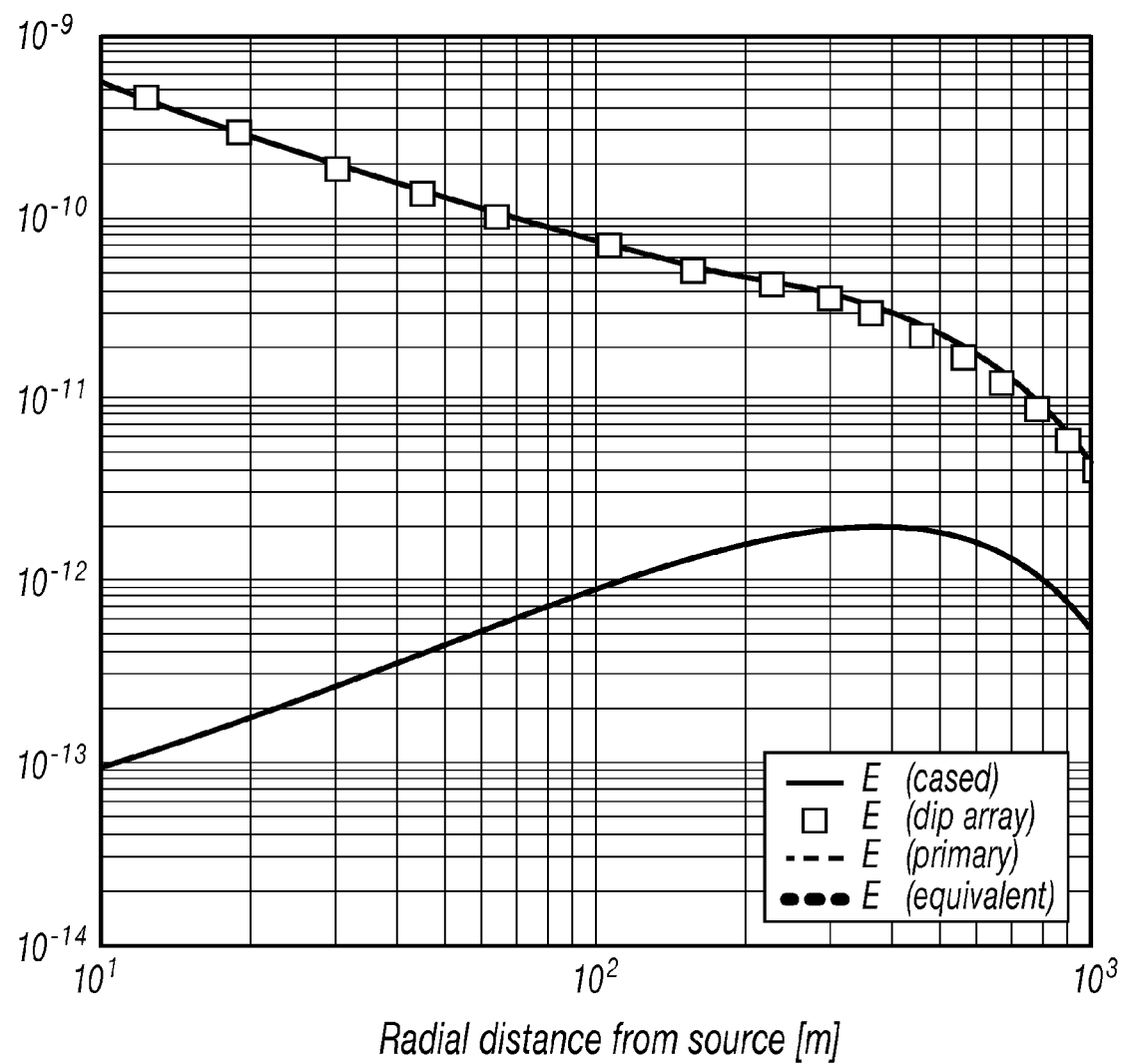
FIGS. 11A-11D are graphs similar to those graphs shown in FIGS. 6A-6B but with the source about 10 meters below the casing and representing a marine borehole to surface scenario with a resistive layer at depth and the receivers located above the seafloor.
Figure 11B:
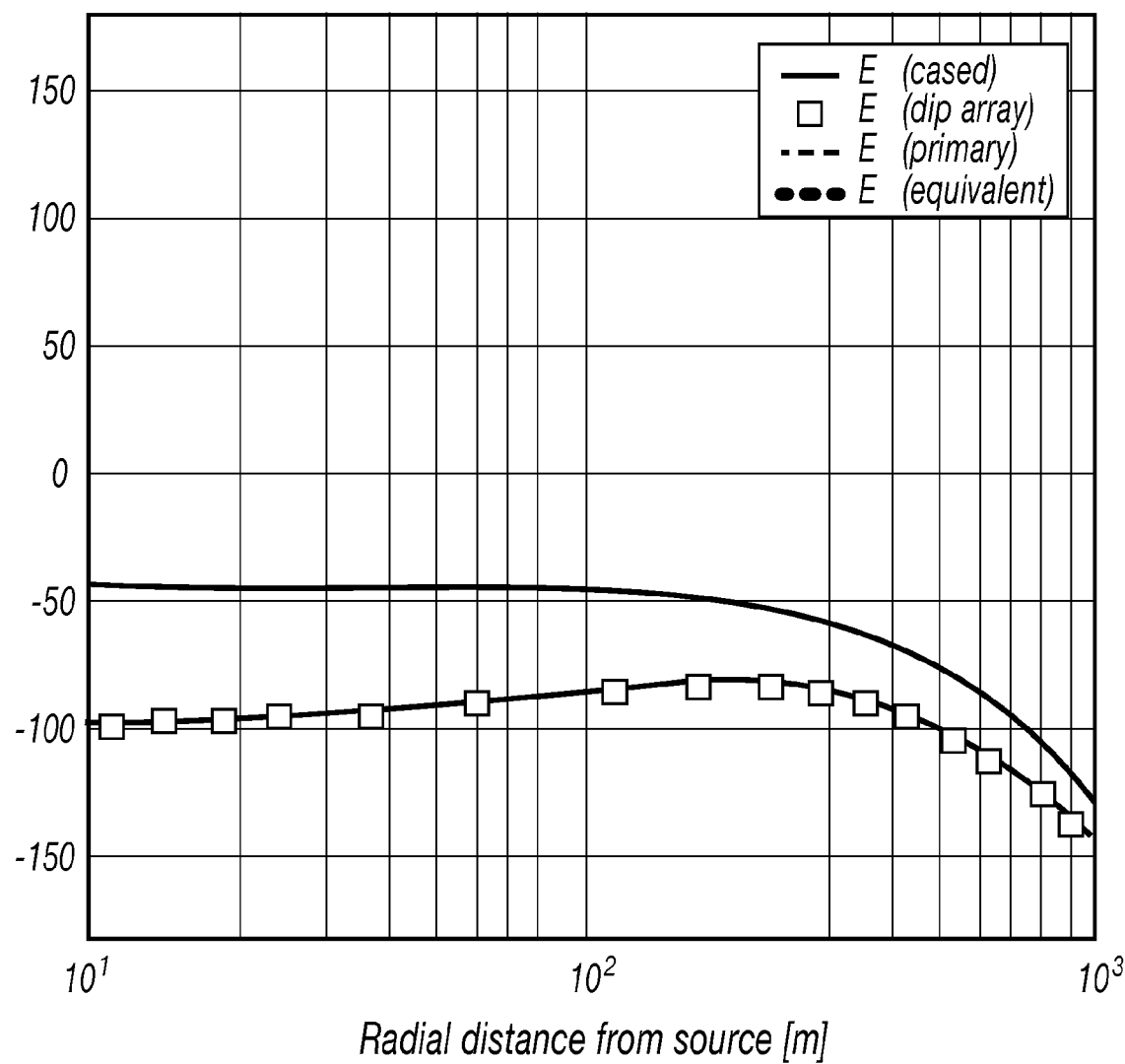
Figure 11C:
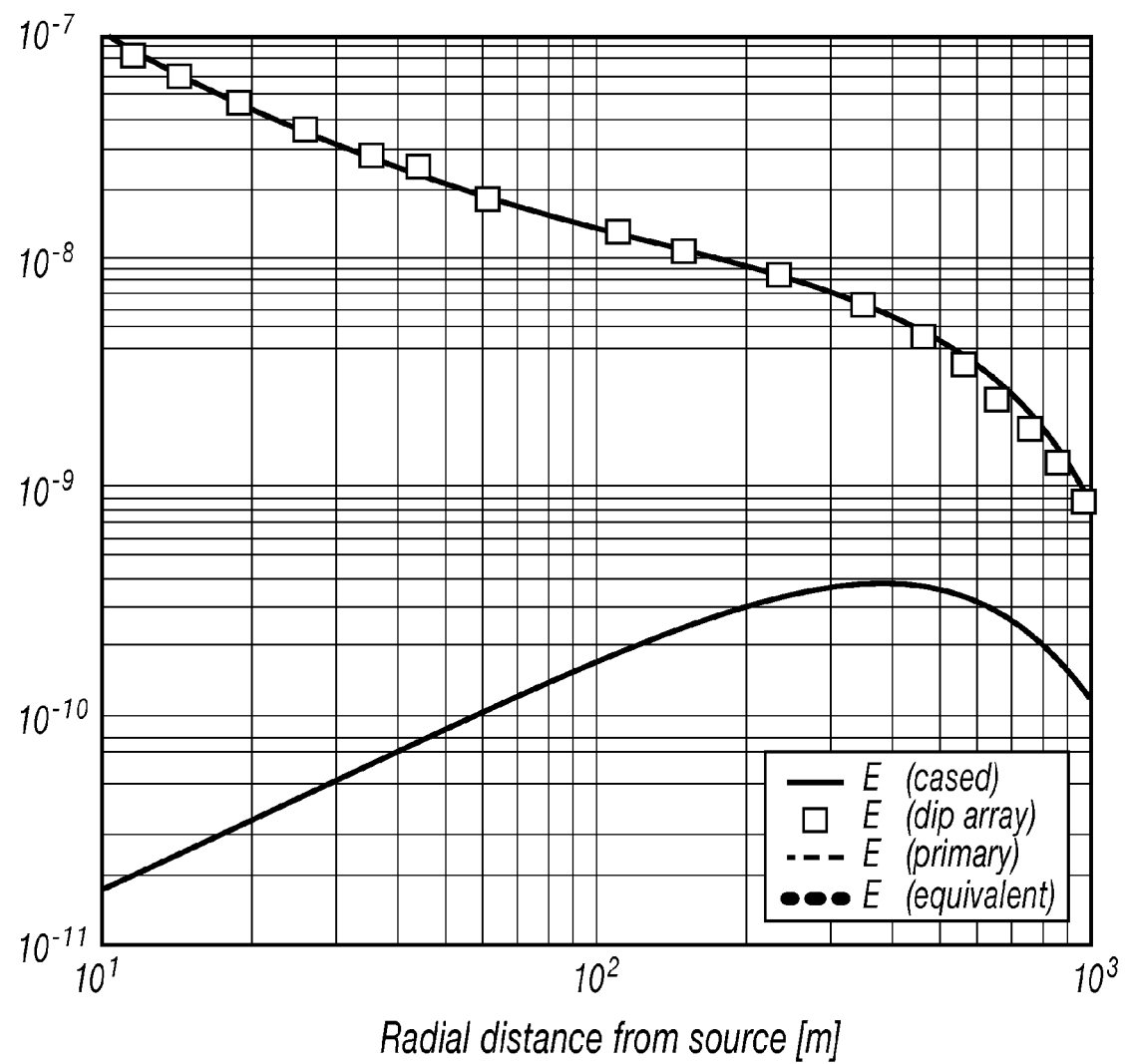
Figure 11D:
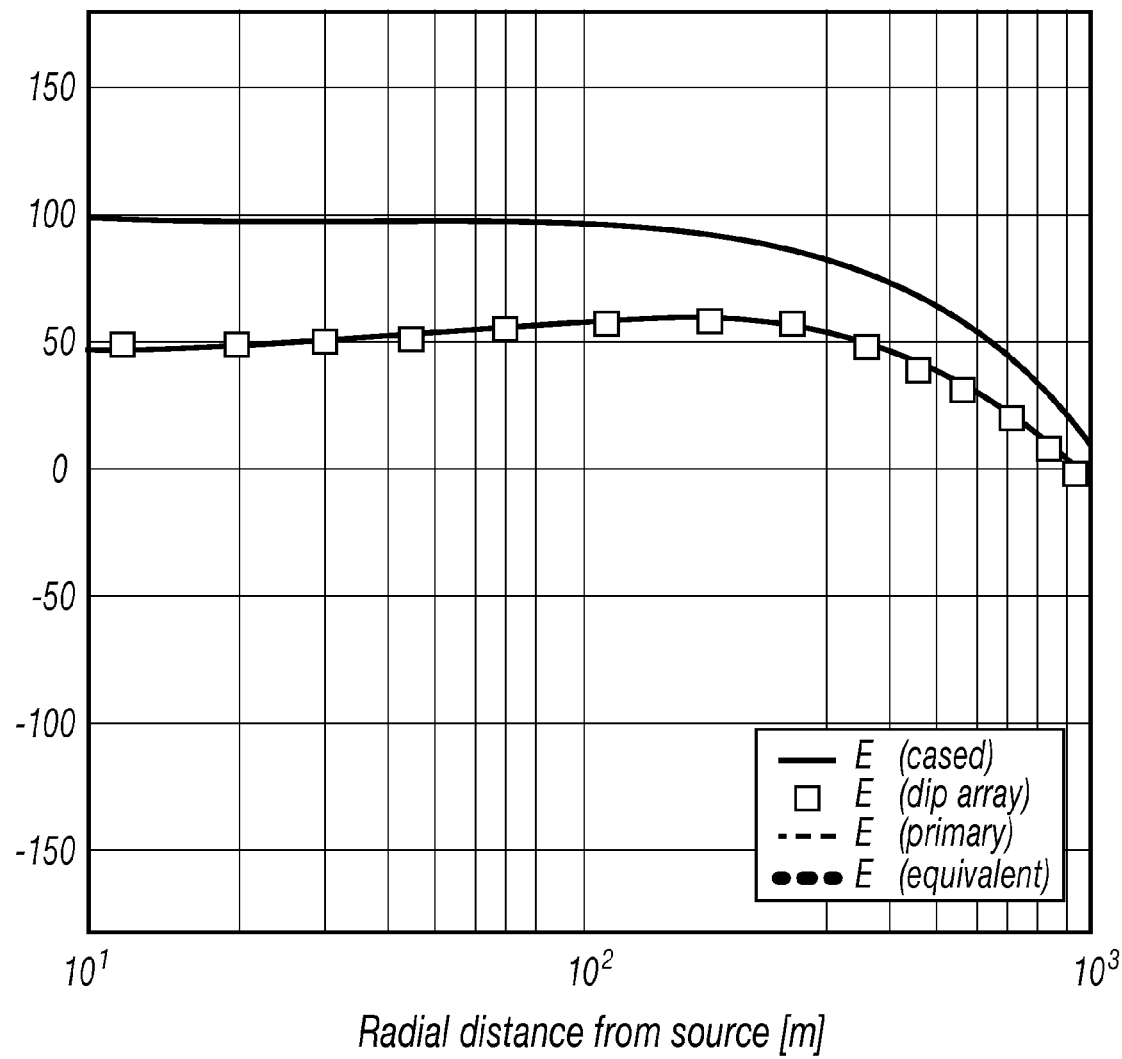

As expected, current will leak less in the resistive medium, and thereby a higher amplitude of the current will be observed above the layer, as shown in the graph of FIG. 10, which shows current amplitude as flowing in the casing 220 as a function of depth with the solid line and without as the dashed lien for the presence of the resistive layer 250. The fields reconstructed using the equivalent dipole array are shown in FIGS. 11(a)-11(d) (dashed line) in comparison to that obtained numerically (solid line). Both the amplitude and the phase of fields are in good agreement, both for the electric and magnetic field. Thus, the weak leakage current in the resistive layer is well described by the equivalent source concept. The graphs in FIGS. 11A-11D represent a marine borehole to surface scenario with a resistive layer at depth and receptors located above the seafloor.

Figure 12:
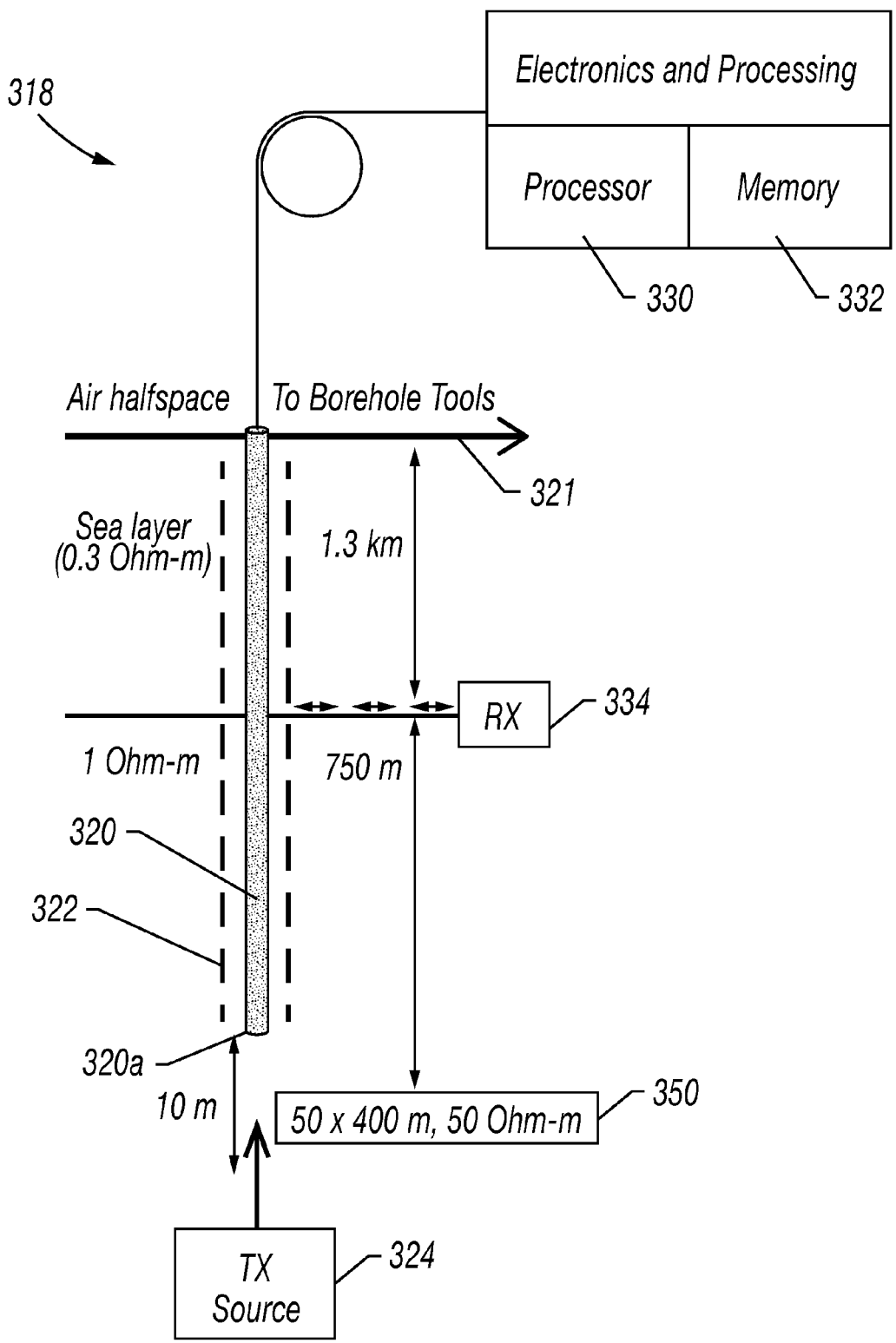
FIG. 12 is another schematic diagram similar to that shown in FIG. 1 and showing a marine borehole to surface scenario, including a resistive body in the vicinity of the well.
Figure 13:
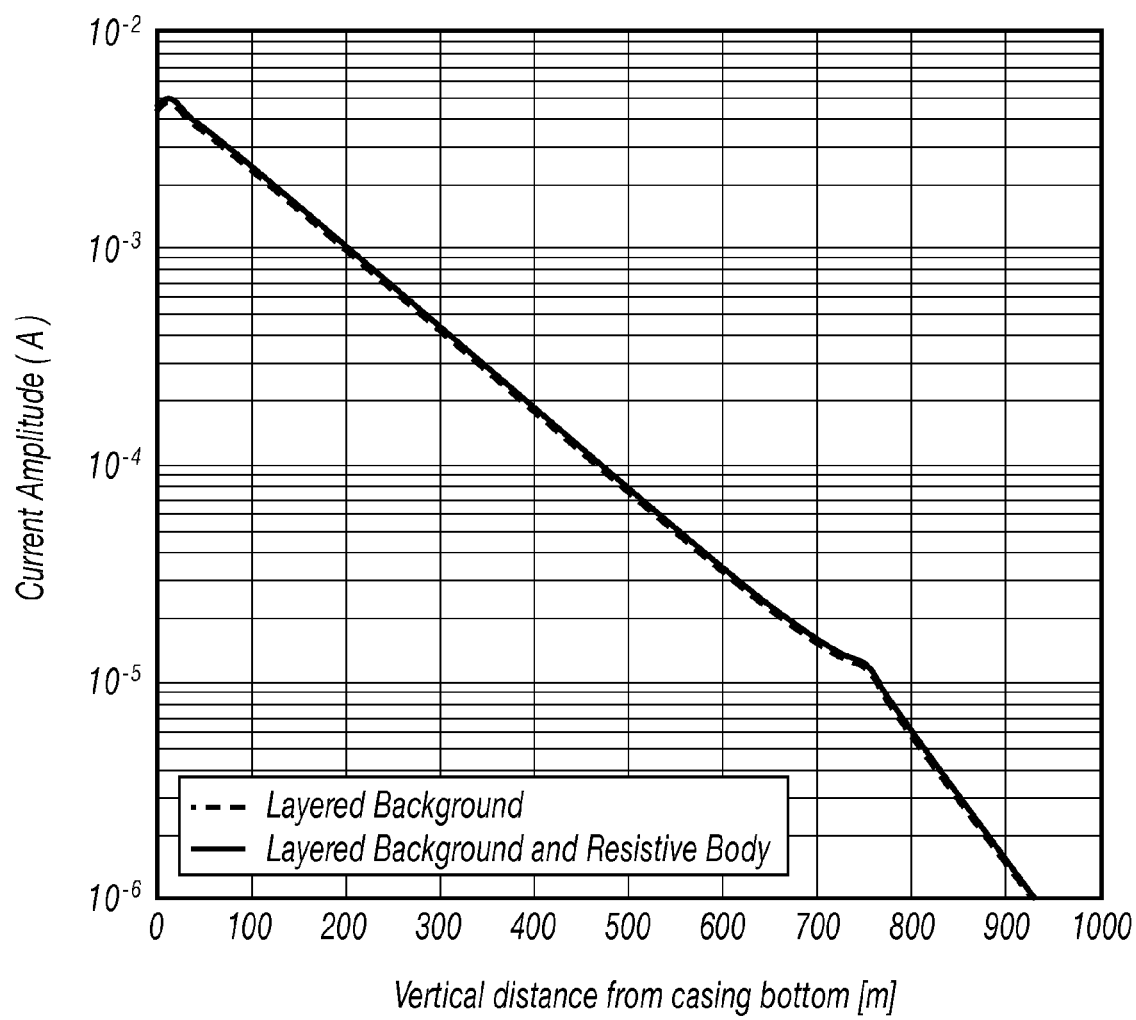
FIG. 13 is a graph showing the current amplitude flowing in the casing as a function of depth with (solid line) and without (dashed line) the presence of a resistive layer at the depth.
Figure 14A:
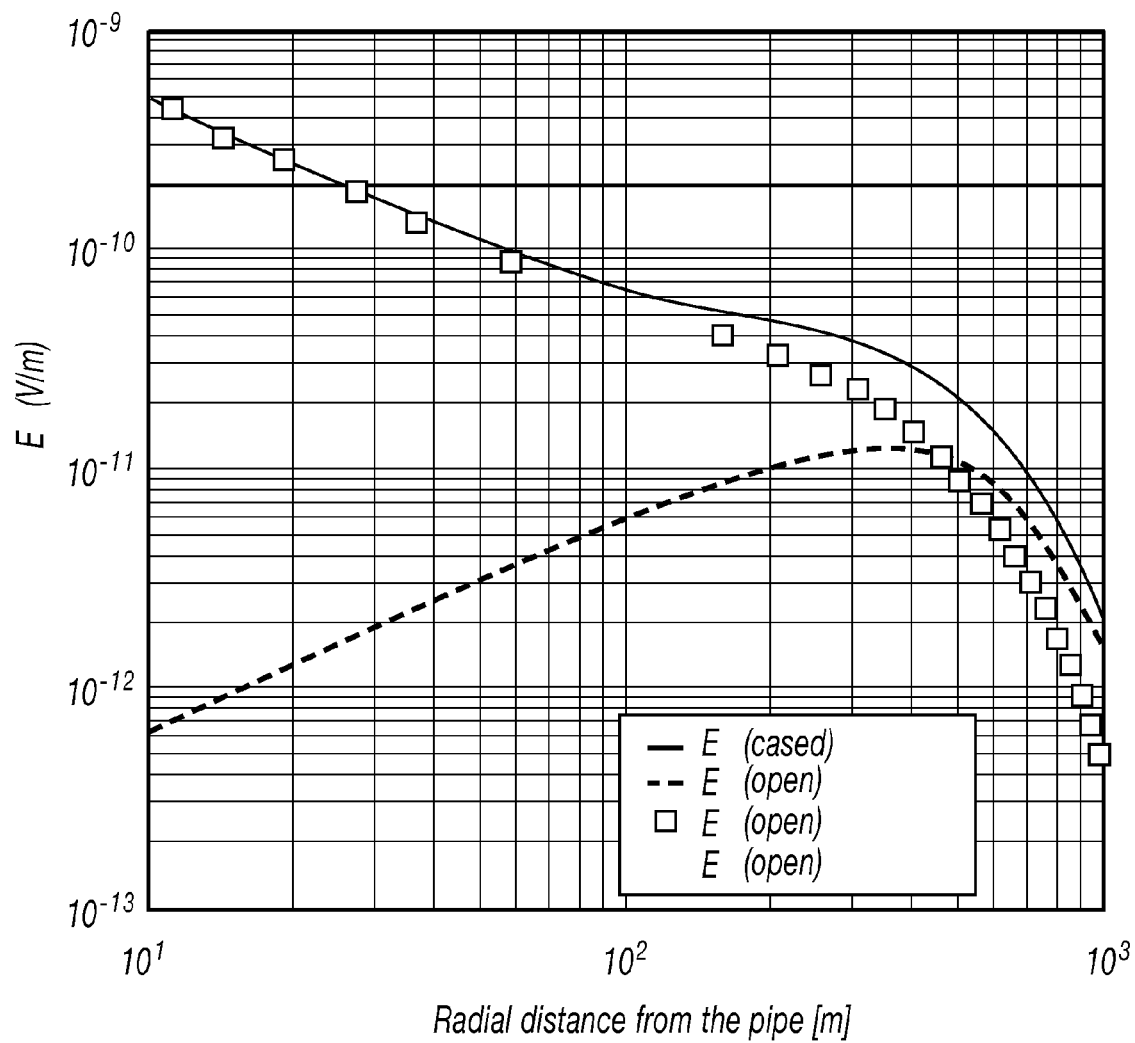
FIGS. 14A and 14B are graphs showing the amplitude in FIG. 14A and the phase in FIG. 14B of the radial electric field as a function of the radial distance from the pipe with the source about 10 meters from the casing and representing a marine borehole to surface scenario and the receivers located above the seafloor.
Figure 14B:
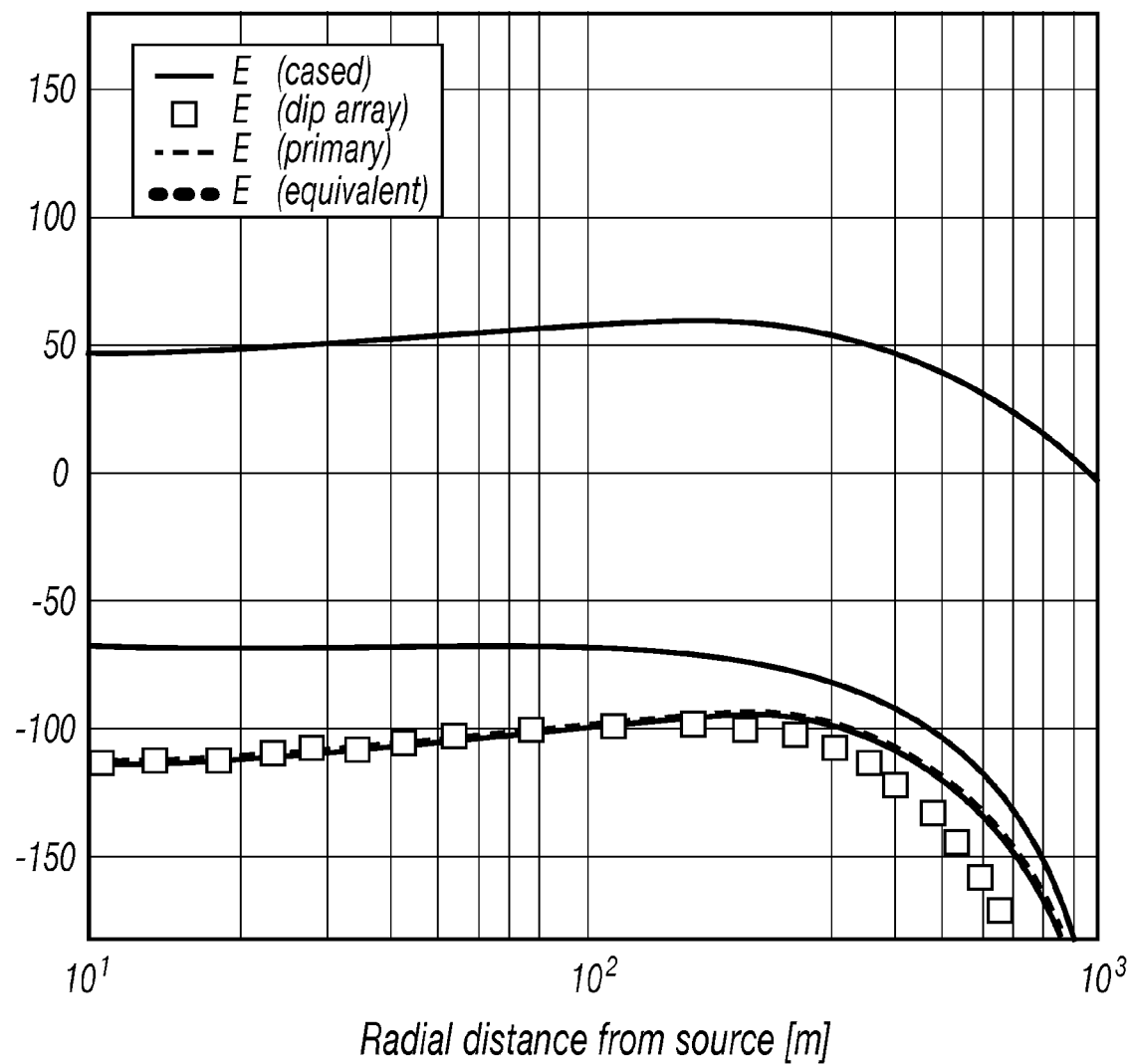

There is also an example of a resistive inhomogeneity near the casing. A resistive anomaly illustrated at 360 in the system 318 of FIG. 12 is added in the vicinity of the well. The azimuthal symmetry of the code yields a doughnut shaped body, but this model is still representative of the effect of a reservoir on the surface to borehole and borehole to surface fields, measured on the seafloor surface as shown in FIG. 12. Reference numerals are in the 300 series in this example. In this example, there may be no evident change in the current leakage, in comparison to the scenario without the resistive body as shown in the graph of FIG. 13. The fields observed at far offsets are still sensitive to the presence of the reservoir. The fields reconstructed using the equivalent dipole array are shown in FIGS. 14A-14B (dashed line) in comparison to that obtained numerically (solid line). Both the amplitude and the phase of fields are in good agreement. At far offsets (greater than about 500 meters), the matching is not as good as in the previous cases. The equivalent source (dashed line) underestimates the fields by about 5%, which is due to the 1D assumption used to evaluate the response of the equivalent source.

Figure 15:
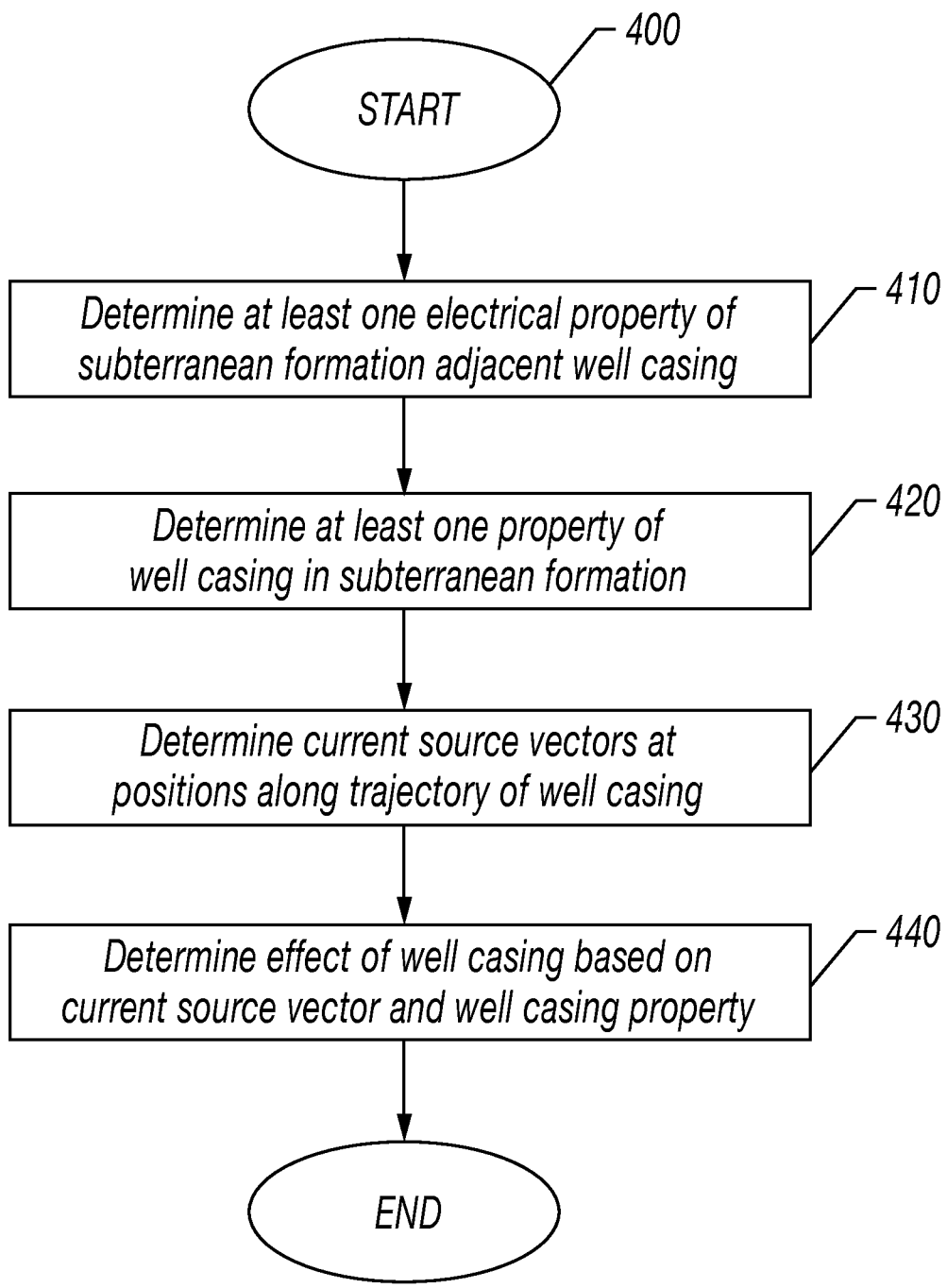
FIG. 15 is a flowchart showing an example methodology.

FIG. 15 is an example flowchart of a method analyzing a subterranean formation in accordance with a non-limiting example. The process starts (block 400) and at least one electrical property of the subterranean formation adjacent the well casing is determined (block 410). At least one property of a well casing in the subterranean formation is determined (block 420) and a plurality of current source vectors at respective positions along a trajectory of the well casing are determined (block 430). An effect of the well casing is determined based upon the plurality of current source vectors and the at least one property of the well casing (block 440). The process ends (block 450).

In one example, the effect of the well casing is determined based upon the at least one electrical property. Determining the plurality of current source vector may include determining a magnitude of each of the current source vectors. It is also possible to assign a direction of each current source vector along an axis of adjacent portions of the well casing. The effect of the well casing may also be further based upon a source below the well casing as described in the various figures and examples above. At least one property of the well casing may include, for example, the casing geometry, a number of casing sections, a casing thickness, a casing magnetic permeability, a casing electrical conductivity, and a casing electrical resistance. The well casing may extend in a vertical direction in some embodiments, although in other embodiments it may extend at other angles, including horizontal. A property of a hydrocarbon reservoir in the subterranean formation may be based upon the effect of the well casing. The processor 30 and memory 32 as shown in the various figures, such as in FIG. 1, may be used to store at least one property of the well casing in the subterranean formation, determine the plurality of current source vectors at respective positions along a trajectory of the well casing and determine an effect of the well casing based upon the plurality of current source vectors and the at least one property of the well casing.

The memory 32 shown in FIG. 1 operates in conjunction with the processor 30 as a non-transitory computer readable medium for analyzing a subterranean formation. A non-transitory computer readable medium has computer executable instructions configured to form operations, such as, storing at least one property of a well casing in the subterranean formation, determining a plurality of current source vectors at respective positions along the trajectory of the well casing and determining an effect of the well casing based upon the plurality of current source vectors and the at least one property of the well casing.

The system and method as described is numerically verified for the case of 1D earth and also for a resistive 2D doughnut structure. It can be extended to 3D anisotropic earth where the casing is replaced by a line of sources and the sources are represented as a superposition of vertical currents along the borehole. The strength of the dipoles is determined by the radial current leaking into the formation which is related to the ratio of the vertical impedance of the casing compared to the radial impedance. The EM problem with a single casing and its solution as described can be similarly expanded for multiple, nested casings and into multiple wells, and the possible extension for curved wells as curved sources along the wells. Interconnected wells may be used in one example. Although the source is located below the casing in the illustrated examples, the source may be moved inside the well similar to an EPulse system.

When the electrical model of the formation survey is accomplished, it may be homogenous earth, 1D layered, 2D or 3D anisotropic. The method and system permits a numerical model to predict the behavior of the earth and used to invert a set of measurements that describe the electrical conductivity of the subsurface such as meters to kilometers from the borehole and may be applied to multiple frequencies using time domain approaches such as Fourier transforming separate frequency results. It may be used in exploration to locate boreholes and in time lapse monitoring to show how extraction or addition to a reservoir is proceeding by solving for the changes and subsurface electrical structures using numerical approaches known to those skilled in the art. The measurements may be combined with seismic or flow simulators to constrain and enhance the resolution of the measurement. The methodology may be extended to non-straight wells and horizontal and vertical wells and pipelines on the surface.

As noted before, the magnitude of current sources may be established by determining the geometry and giving the phase and magnitude relationship with the source. The current may be computed using log information to determine approximate 1D properties around the casing and run a 1D azimuthally symmetric calculation of the fields. The properties of the current flowing in the casing depend on the properties of the formation around the casing. It is possible to assume that the 1D assumption holds and the current flowing in the casing is computed from the azimuthal component of the magnetic field, which is calculated as explained above. The calculations are directed to the azimuthally symmetric system as described above, i.e., a vertical cylindrical (multiple) casing. It may be possible to accomplish such in a deviated well.

The system and methodology as described accounts for the effect of the conductive casing in the 3D simulation of STB-EM (surface to borehole EM and borehole to surface EM) measurements. The algorithm relies on the numerical calculation of the current flowing in the pipe and its discretization as a function of depth to yield an array of vertical electric dipoles of varying moment amplitude and phase. The response of the 1D background model to the array of sources is computed using a semi-analytical formulation. The fields are regarded as the casing response, and they can be additively included in a general 3D simulation, of the response in the 3D medium without a steel casing. The technique has been tested in a wholespace, marine halfspace, marine halfspace with a resistive layer and marine halfspace with a resistive 3D body. The fields computed using an azimuthally symmetric code agree with those reconstructed using the equivalent source technique. The last case scenario of a resistive body appears to differ from that reconstructed using the equivalent source method. This arises because the equivalent field is computed using the 1D background of the model. Ideally the method may evaluate the fields due to the array of dipoles honoring the true complexity of the model. In practice, however, this may be inefficient given the fine discretization required for the current as a function of depth.

It should be understood that the methods are performed via a controller, including a processor, such as a microprocessor, coupled to a memory, such as a RAM or ROM, in cooperation with the appropriate sensors and apparatuses for data collection as shown in FIG. 1. It will be readily apparent to one of skill in the art how to interconnect the controller with the sensors and other apparatuses. By memory, it is meant that the memory is a physical device. In addition, it should be understood that all methods herein may be embodied in computer executable instructions loaded on a non-transitory computer readable medium that, when executed by a computer, cause the computer to perform one or more of the methods described above.

Many modifications and other embodiments will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of analyzing a subterranean formation comprising:

determining at least one property of a well casing in the subterranean formation;

determining a plurality of current source vectors at a plurality of positions along a trajectory of the well casing; and determining an effect of current channeling along the trajectory of the well casing on an electric field measurement based upon the plurality of current source vectors, and the at least one property of the well casing.

2. The method according to claim 1 further comprising determining at least one electrical property of the subterranean formation adjacent the well casing; and wherein determining the effect the well casing is further based upon the at least one electrical property.

3. The method according to claim 1 wherein determining the plurality of current source vectors comprises determining a magnitude of each of the current source vectors.

4. The method according to claim 1 wherein determining the plurality of current source vectors comprises assigning a direction of each current source vector along an axis of adjacent portions of the well casing.

5. The method according to claim 1 wherein determining the effect of the well casing is further based upon an electric source below the well casing.

6. The method according to claim 1 wherein the at least one property comprises at least one of a casing geometry, a number of casing sections, a casing thickness, a casing magnetic permeability, a casing electrical conductivity, and a casing electrical resistance.

7. The method according to claim 1 wherein the well casing extends in a vertical direction.

8. The method according to claim 1 further comprising determining a property of a hydrocarbon reservoir in the subterranean formation based upon the effect of the well casing.

9. A system for analyzing a subterranean formation comprising:
  a processor and a memory coupled thereto to
    store at least one property of a well casing in the subterranean formation in a storage device,
    determine a plurality of current source vectors at a plurality of positions along a trajectory of the well casing, and
    determine an effect of current channeling along the trajectory of the well casing on an electric field measurement based upon the plurality of current source vectors, and the at least one property of the well casing.

10. The system according to claim 9 wherein said processor and memory are also to determine at least one electrical property of the subterranean formation adjacent the well casing, and determine the effect of the well casing further based upon the at least one electrical property.

11. The system according to claim 9 wherein said processor and memory are also to determine the plurality of current source vectors by determining a magnitude of each of the current source vectors.

12. The system according to claim 9 wherein said processor and memory are also to determine the plurality of current source vectors by assigning a direction of each current source vector along an axis of adjacent portions of the well casing.

13. The system according to claim 9 wherein said processor and memory are also to determine the effect of the well casing further based upon an electric source below the well casing.

14. The system according to claim 9 wherein the at least one property comprises at least one of a casing geometry, a number of casing sections, a casing thickness, a casing magnetic permeability, a casing electrical conductivity, and a casing electrical resistance.

15. The system according to claim 9 wherein the well casing extends in a vertical direction.

16. The system according to claim 9 wherein said processor and memory are also to determine a property of a hydrocarbon reservoir in the subterranean formation based upon the effect of the well casing.

17. A non-transitory computer readable medium for analyzing a subterranean formation, the non-transitory computer readable medium having computer executable instructions configured to perform operations comprising:
  storing at least one property of a well casing in the subterranean formation;
  determining a plurality of current source vectors at a plurality of positions along a trajectory of the well casing; and
  determining an effect of current channeling along the trajectory of the well casing on an electric field measurement based upon the plurality of current source vectors, and the at least one property of the well casing.

18. The non-transitory computer readable medium according to claim 17 wherein the operations further comprise determining at least one electrical property of the subterranean formation adjacent the well casing; and wherein determining the effect of the well casing is further based upon the at least one electrical property.

19. The non-transitory computer readable medium according to claim 17 wherein determining the plurality of current source vectors comprises determining a magnitude of each of the current source vectors.

20. The non-transitory computer readable medium according to claim 17 wherein determining the plurality of current source vectors comprises assigning a direction of each current source vector along an axis of adjacent portions of the well casing.

21. The non-transitory computer readable medium according to claim 17 wherein determining the effect of the well casing is further based upon an electric source below the well casing.

22. The non-transitory computer readable medium according to claim 17 wherein the at least one property comprises at least one of a casing geometry, a number of casing sections, a casing thickness, a casing magnetic permeability, a casing electrical conductivity, and a casing electrical resistance.

23. The non-transitory computer readable medium according to claim 17 wherein the operations further comprise determining a property of a hydrocarbon reservoir in the subterranean formation based upon the effect of the well casing.

* * * * *